(12) United States Patent
Tsuruyama et al.

(10) Patent No.: US 10,841,493 B2
(45) Date of Patent: Nov. 17, 2020

(54) OPTICAL FILTER, IMAGING DEVICE, AND RANGING DEVICE

(71) Applicant: KABUSHIKI KAISHA TOSHIBA, Tokyo (JP)

(72) Inventors: Tomoya Tsuruyama, Kanagawa (JP); Akihisa Moriya, Tokyo (JP); Nao Mishima, Tokyo (JP); Takayuki Sasaki, Tokyo (JP); Jun Yamaguchi, Kanagawa (JP); Tatsuo Kozakaya, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/283,949

(22) Filed: Feb. 25, 2019

(65) Prior Publication Data

US 2020/0092482 A1    Mar. 19, 2020

(30) Foreign Application Priority Data

Sep. 13, 2018  (JP) .................................. 2018-171503

(51) Int. Cl.
  *H04N 5/232* (2006.01)
  *H04N 5/225* (2006.01)
  (Continued)

(52) U.S. Cl.
  CPC ......... *H04N 5/23267* (2013.01); *G02B 5/201* (2013.01); *G02B 7/006* (2013.01);
  (Continued)

(58) Field of Classification Search
  CPC .. H04N 5/23267; H04N 5/2254; G03B 11/00;
  G02B 7/006; G02B 5/201; G06T 5/003;
  G06K 9/6215
  See application file for complete search history.

(56) References Cited

U.S. PATENT DOCUMENTS 4,416,528 A * 11/1983 Breslau .................. G03B 11/06
                                                          359/892
6,834,161 B1 * 12/2004 Stiehler .................. G03B 11/06
                                                          396/103

(Continued)

FOREIGN PATENT DOCUMENTS

| JP | 2012-2859 A | 1/2012 |
| JP | 2016-102733 | 6/2016 |
| JP | 2017-40642 | 2/2017 |

*Primary Examiner* — Timothy J Henn
(74) *Attorney, Agent, or Firm* — Finnegan, Henderson, Farabow, Garrett & Dunner, L.L.P.

(57) ABSTRACT

According to one embodiment, an optical filter associated with a lens unit having a first end includes a filter part, a filter frame, and an attachment part. The filter part includes a first filter area that transmits light rays of a first wavelength band and a second filter area that transmits light rays of a second wavelength band. The first wavelength band and the second wavelength band include a common wavelength band. The filter frame holds the filter part. The attachment part is coupled with the filter frame and is detachably attached to the first end of the lens unit. When the attachment part is attached to the first end of the lens unit, a distance between the filter part and an aperture within the lens unit is longer than a distance between the first end and the aperture.

20 Claims, 17 Drawing Sheets

(51) Int. Cl.
    *G06T 5/00*     (2006.01)
    *G06K 9/62*     (2006.01)
    *G02B 5/20*     (2006.01)
    *G02B 7/00*     (2006.01)
    *G03B 11/00*    (2006.01)
(52) U.S. Cl.
    CPC ............ G03B 11/00 (2013.01); G06K 9/6215
        (2013.01); G06T 5/003 (2013.01); H04N
        5/2254 (2013.01)

(56)           References Cited
           U.S. PATENT DOCUMENTS

| | | | |
|---|---|---|---|
| 2004/0264001 A1* | 12/2004 | Tsuchiya | H04N 5/2254 359/704 |
| 2007/0297790 A1* | 12/2007 | Kogure | G03B 17/14 396/504 |
| 2011/0026916 A1* | 2/2011 | Neiman | G03B 17/00 396/533 |
| 2011/0128638 A1* | 6/2011 | Shibasaki | G03B 11/00 359/819 |
| 2012/0033962 A1* | 2/2012 | Hyodo | G03B 11/00 396/544 |
| 2012/0250153 A1* | 10/2012 | Kawasaki | G03B 17/565 359/477 |
| 2013/0265662 A1* | 10/2013 | Araie | G02B 7/02 359/827 |
| 2014/0071548 A1* | 3/2014 | Sanford | F16B 21/04 359/828 |
| 2014/0118608 A1* | 5/2014 | Okuda | H04N 5/2254 348/345 |
| 2016/0154152 A1* | 6/2016 | Moriuchi | H04N 5/2254 348/374 |
| 2017/0054910 A1* | 2/2017 | Moriuchi | G06T 5/003 |
| 2017/0078537 A1* | 3/2017 | Peddecord | H04N 5/2252 |
| 2018/0136477 A1* | 5/2018 | Moriuchi | G06T 7/571 |
| 2018/0164600 A1* | 6/2018 | Huang | G02B 27/281 |
| 2018/0210223 A1* | 7/2018 | Sharp | H04N 5/2252 |
| 2018/0372982 A1* | 12/2018 | Lemay | G03B 11/00 |
| 2019/0391357 A1* | 12/2019 | Kobayashi | G02B 5/30 |
| 2020/0019043 A1* | 1/2020 | Clark | G03B 17/14 |
| 2020/0051264 A1* | 2/2020 | Mishima | G06T 7/77 |

\* cited by examiner

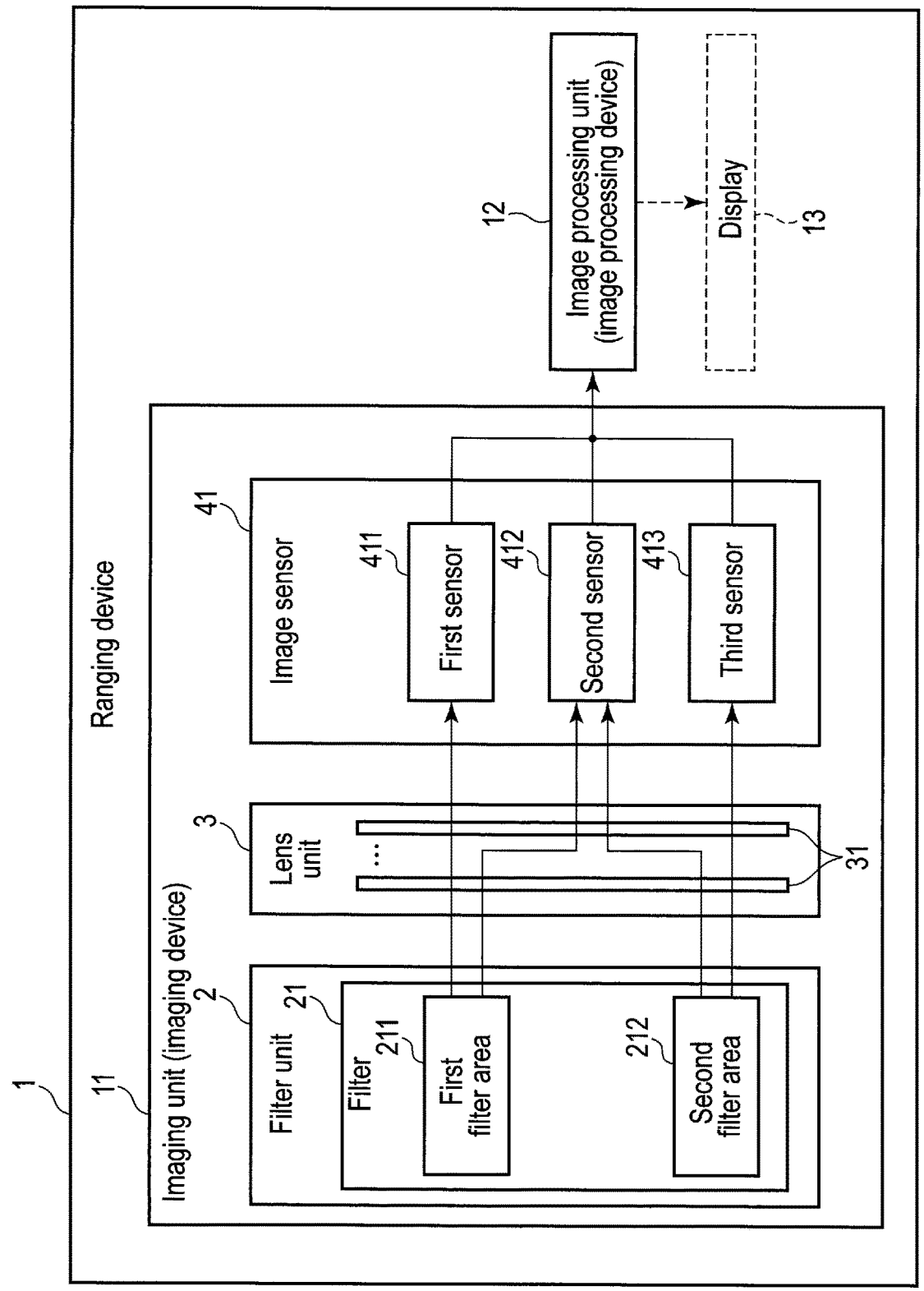
F I G. 1

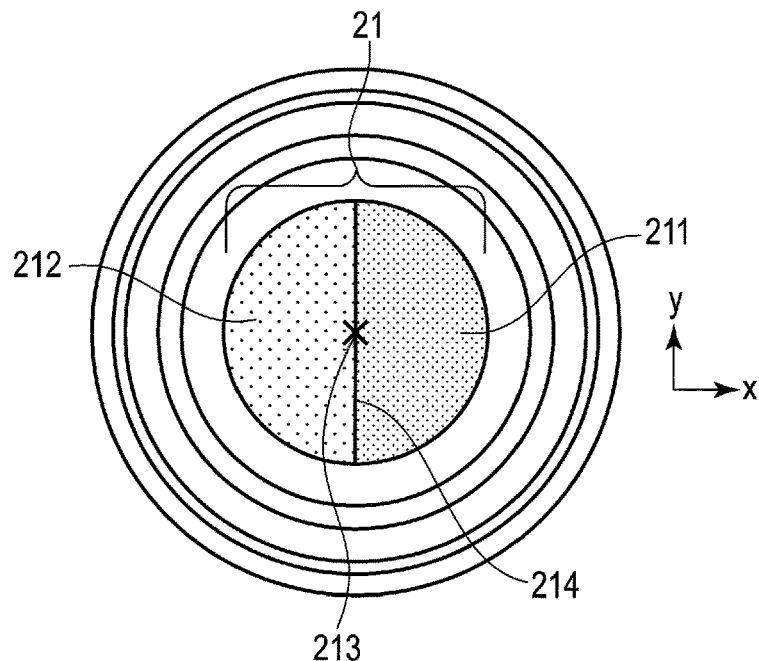
F I G. 2
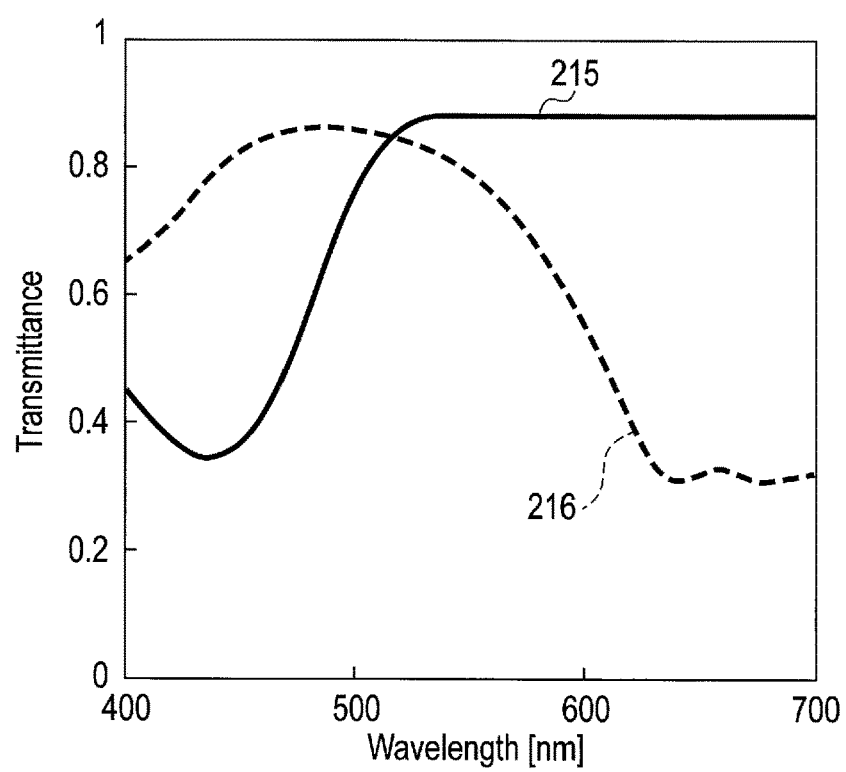
F I G. 3

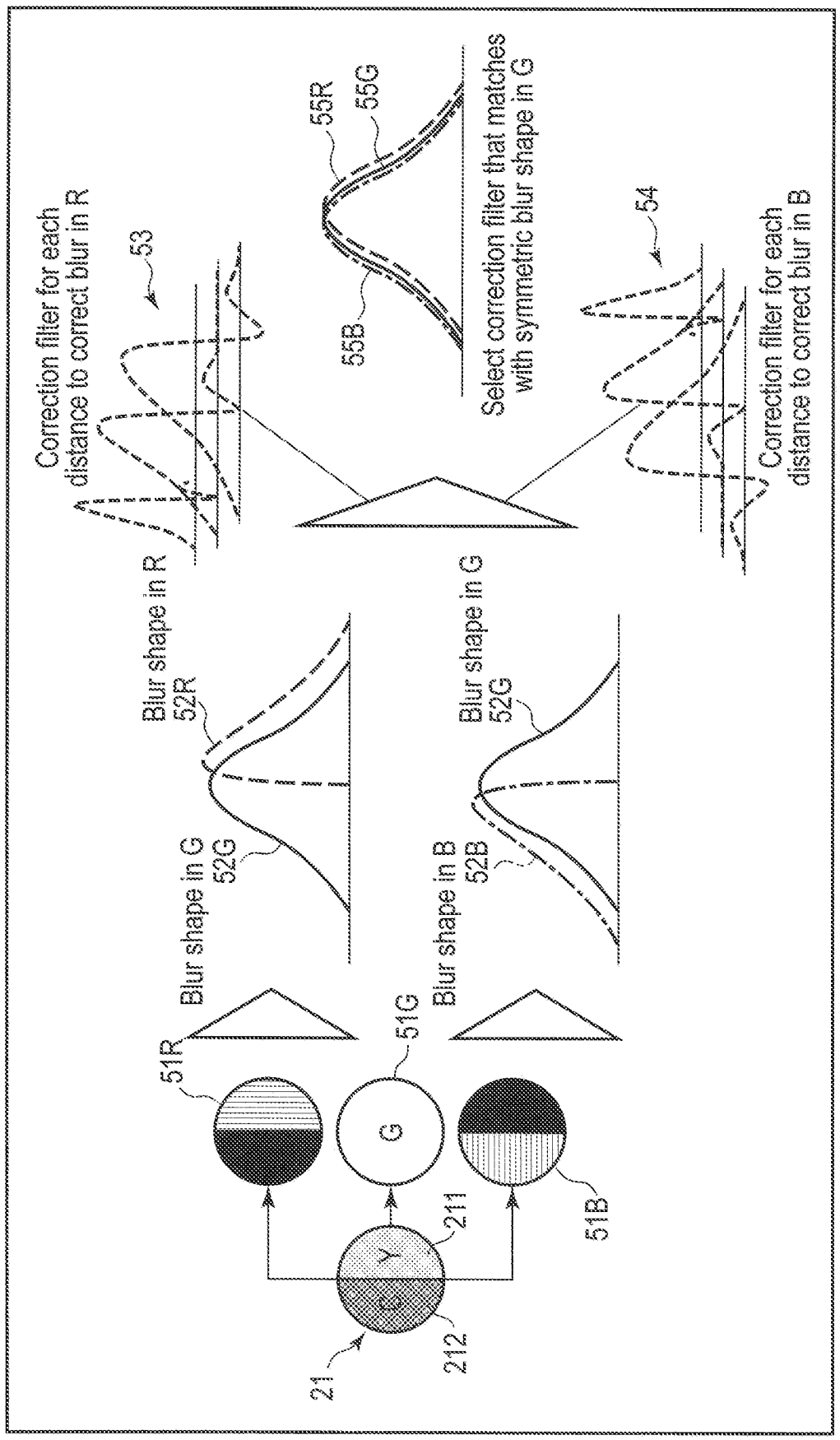
F I G. 5

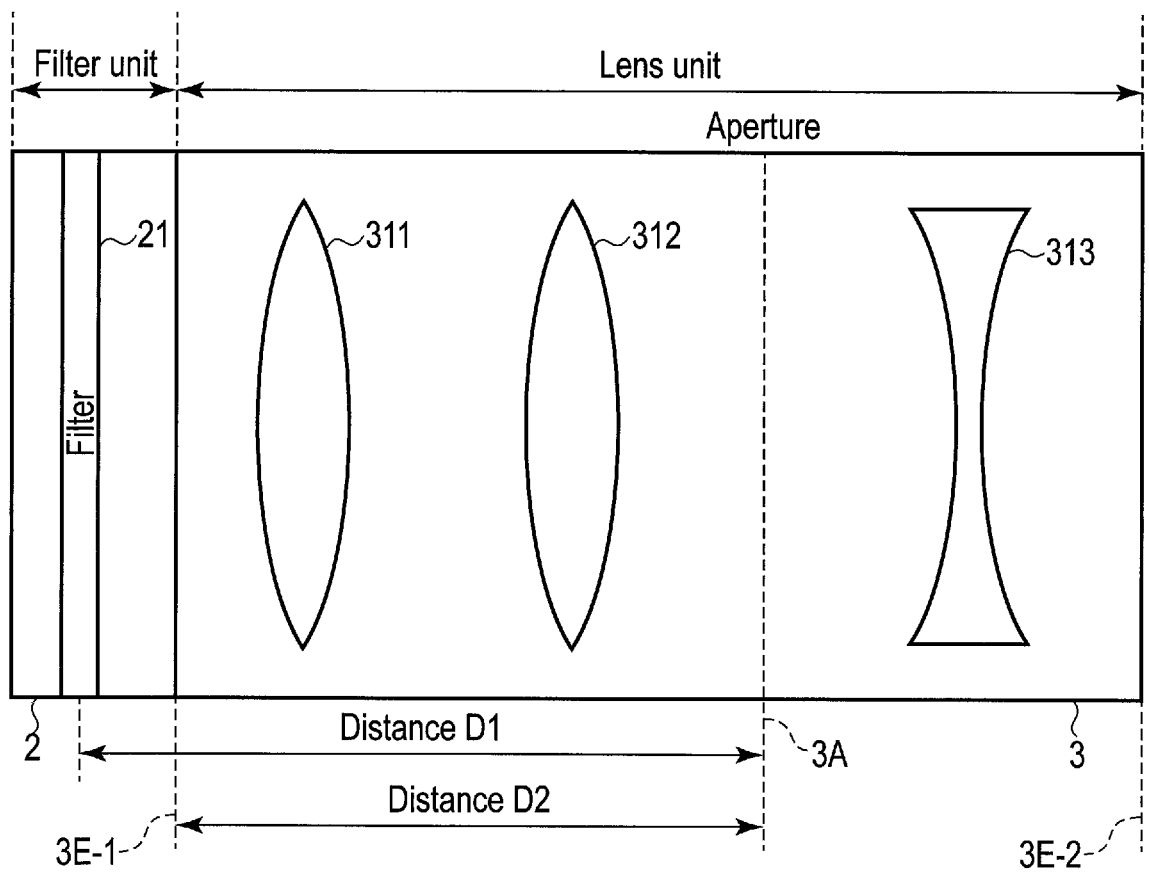
F I G. 7

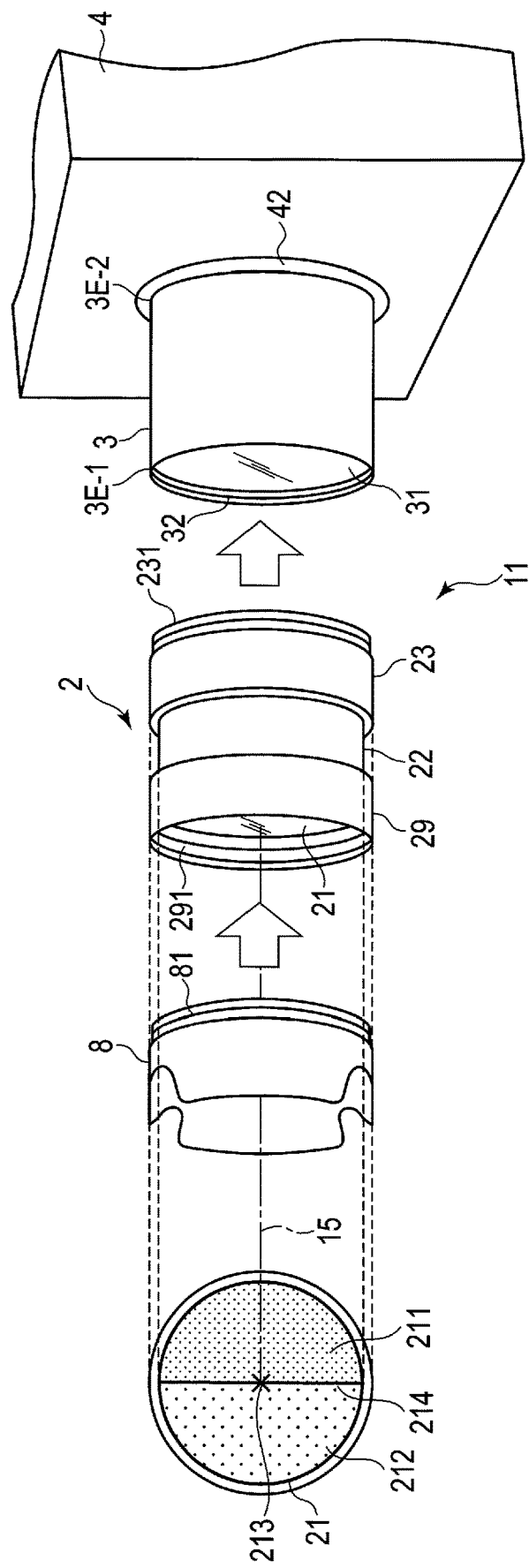
F I G. 11

OPTICAL FILTER, IMAGING DEVICE, AND RANGING DEVICE

CROSS-REFERENCE TO RELATED APPLICATIONS

This application is based upon and claims the benefit of priority from Japanese Patent Application No. 2018-171503, filed Sep. 13, 2018, the entire contents of which are incorporated herein by reference.

FIELD

Embodiments described herein relate generally to an optical filter, an imaging device, and a ranging device.

BACKGROUND

A technique for obtaining a distance to an object from images captured by two cameras or a stereo camera (a binocular camera) is known. Furthermore, there is a technique recently proposed to obtain a distance to an object from images captured by one camera (a monocular camera).

As a technique for obtaining a distance to an object from images captured by one camera, a technique of using a camera with a color filter that is disposed at an aperture of the camera.

A camera includes a lens unit containing one or more lenses, and an aperture is inside the lens unit. Thus, it is difficult to arrange a color filter in an aperture of a commercially-available camera, and it is also difficult to change an orientation of the color filter disposed at the aperture.

BRIEF DESCRIPTION OF THE DRAWINGS

FIG. 1 is a block diagram of an example of the structure of a ranging device that includes an imaging device according to a first embodiment;

FIG. 2 is a view illustrating an example of the structure of a filter included in the imaging device of the first embodiment;

FIG. 3 is a view illustrating an example of transmittance characteristics of the filter in FIG. 2;

FIG. 5 is a view illustrating an example of a method for calculating a distance to an object using blurs on images by the imaging device of the first embodiment;

FIG. 7 is a cross-sectional view illustrating an example of the structure of a filter unit and a lens unit in the imaging device of the first embodiment;

FIG. 11 is a perspective view illustrating another example of the structure of the imaging device of the first embodiment;

DETAILED DESCRIPTION

Figure 4:
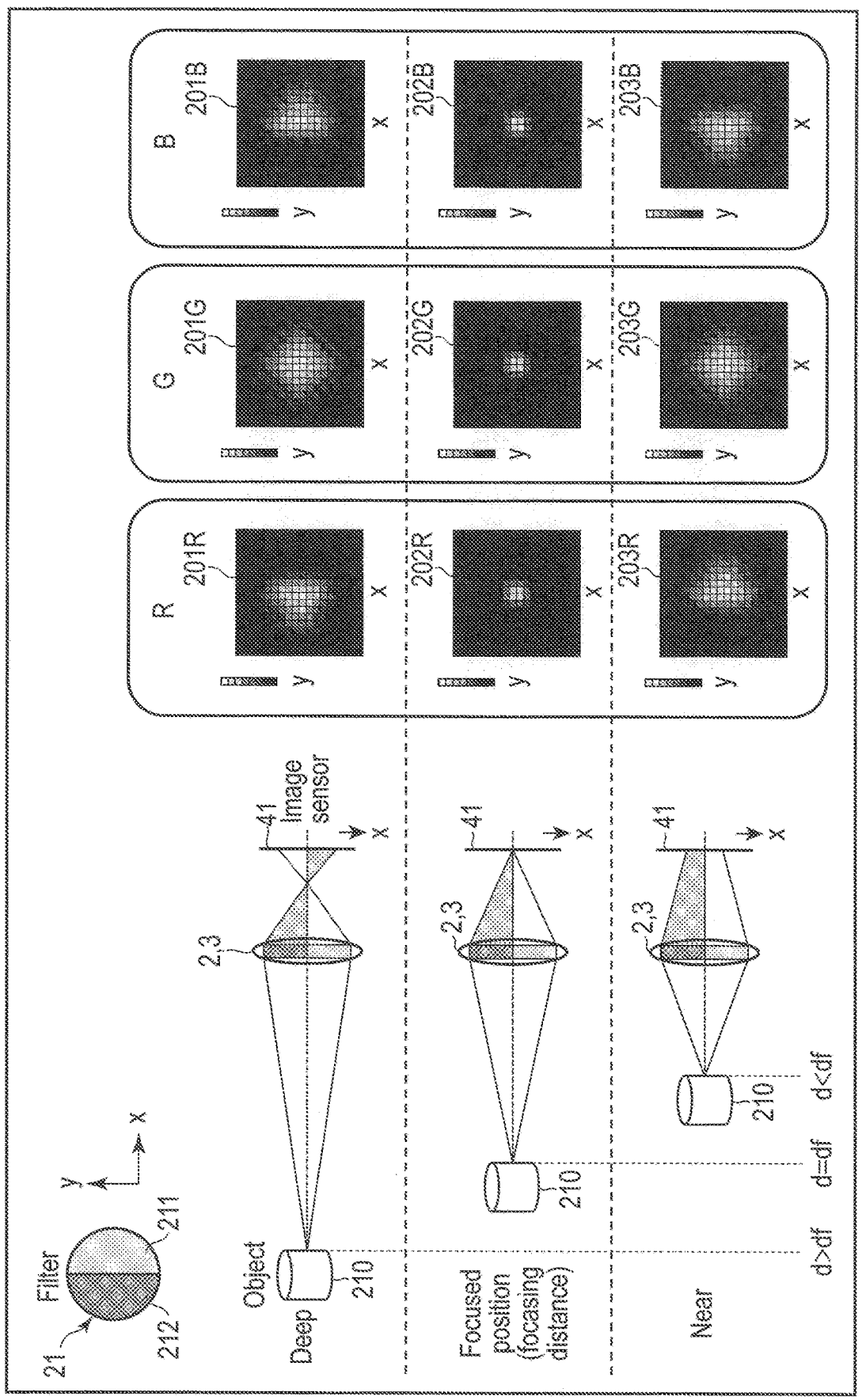
FIG. 4 is a view illustrating an example of a relationship between changes in light rays in the imaging device of the first embodiment and blur shapes on an image generated by the imaging device.

Various embodiments will be described hereinafter with reference to the accompanying drawings.

In general, according to one embodiment, an optical filter associated with a lens unit having a first end includes a filter part, a filter frame, and an attachment part. The filter part includes a first filter area that transmits light rays of a first wavelength band and a second filter area that transmits light rays of a second wavelength band. The first wavelength band and the second wavelength band include a common wavelength band. The filter frame holds the filter part. The attachment part is coupled with the filter frame and is detachably attached to the first end of the lens unit. When the attachment part is attached to the first end of the lens unit, a distance between the filter part and an aperture within the lens unit is longer than a distance between the first end and the aperture.

First Embodiment

With reference to FIG. 1, a ranging device including an imaging device according to a first embodiment will be explained. The ranging device 1 generates an image and estimates a position of an object, which is captured in the image, on the real scale (full scale) by using the image. The estimated position of the object includes at least a distance (also referred to as a depth) from a position of the ranging device 1 to the object. The estimated position of the object is represented, for example, by coordinates in a three-dimensional space.

The ranging device 1 includes an imaging unit 11 that generates an image and an image processing unit 12 that processes the image. The ranging device 1 may be realized as a device that includes the imaging unit 11 and the image processing unit 12, or may be realized as a system that includes multiple devices such as an image device corresponding to the imaging unit 11 and an image processing device corresponding to the image processing unit 12. The imaging unit 11 has a function of obtaining an image of an object and information relating to a distance to the object by one shot. With this function, for example, the imaging unit 11 obtains an image in which distance information to the object at the time of imaging is encoded. The image processing unit 12 can be realized as, for example, a computer or an embedded system incorporated in various electronic devices. The image processing unit 12 has a function to generate three-dimensional data of an object (for example, three-dimensional coordinates of an object, a distance to an object, etc.) using one or more images generated by the imaging unit 11.

The ranging device 1 may further include a display 13. The image processing unit 12 sends image signals to the display 13, and the display 13 displays a screen image based on the image signals. The screen image to be displayed may include an image generated by the imaging unit 11 and may include various information obtained by processing the image.

As illustrated in FIG. 1, the imaging unit 11 may be realized as a monocular camera that includes a filter unit 2, a lens unit (for example, a lens-barrel) 3, and an image sensor 41. One end of the lens unit 3 is detachably attached to the camera main body that includes the image sensor 41. The filter unit 2 is detachably attached to the other end of the lens unit 3. The imaging unit 11 may be structured such that the one end of the lens unit 3 is directly or indirectly attached to the camera main body including the image sensor 41 and the filter unit 2 is directly or indirectly attached to the other end of the lens unit 3.

The camera main body and the lens unit 3 may include mounts which can be mechanically and optically connected to each other. For example, when a mount in the camera main body (also referred to as a lens mount) and a mount in the lens unit 3 (also referred to as a body mount) have corresponding shapes, the lens unit 3 is attached to the camera main body by connecting the lens mount and the body mount. The type of the mounts may include, for example, screw type mounts or bayonet type mounts, and any type of the mounts can be adopted.

Furthermore, for example, when the lens mount in the camera main body and the body mount in the lens unit 3 do not have corresponding shapes, the one end of the lens unit 3 is indirectly attached to the camera main body using a mount adapter that can be interposed between the lens unit 3 and the camera main body. That is, a state where the one end of the lens unit 3 is indirectly attached to the camera main body indicates that a mount adapter is attached to the camera main body and the one end of the lens unit 3 is attached to the mount adapter, for example.

Furthermore, a state where the filter unit 2 is indirectly attached to the other end of the lens unit 3 indicates that a filter other than the filter unit 2 is attached to the other end of the lens unit 3 and the filter unit 2 is attached to the filter.

The filter unit 2 includes an optical filter 21 (hereinafter, also referred to as a filter 21). The filter 21 includes filter areas which transmit light rays of different wavelength bands (for example, light rays of different color components), respectively. The wavelength bands may partly overlap. The filter 21 includes, for example, a first filter area 211 and a second filter area 212 as color filter areas of two colors. For example, the first filter area 211 transmits light rays of a first wavelength band. The second filter area 212 transmits light rays of a second wavelength band. The first wavelength band and the second wavelength band include a common wavelength band.

The lens unit 3 includes one or more lenses 31.

The image sensor 41 receives the light rays transmitting the filter 21 and the lenses 31, and converts (photoelectric-converts) the received light rays into electrical signals. The image sensor 41 includes a first imaging element, a second imaging element, and a third imaging element. The first imaging element receives light rays of the common wavelength band. The second imaging element receives light rays of a wavelength band which is within the first wavelength band and is different from the common wavelength band. The third imaging element receives light rays of a wavelength band which is within the second wavelength band and is different from the common wavelength band.

Examples of the image sensor 41 include a charge coupled device (CCD) and a complementary metal oxide semiconductor (CMOS). The image sensor 41 includes at least two kinds of imaging elements. Specifically, the image sensor 41 includes, for example, a first sensor 411 including imaging elements that receive red (R) light rays, a second sensor 412 including imaging elements that receive green (G) light rays, and a third sensor 413 including imaging elements that receive blue (B) light rays. Each imaging element receives light rays of a corresponding wavelength band, and converts the received light rays into electrical signals. An analogue-to-digital (A/D) conversion is performed on the electrical signals to generate a color image. Hereinafter, color component images (also referred to as wavelength component images) which are images of an R component, a G component, and a B component are also referred to as an R image, a G image, and a B image, respectively. It should be noted that the R, G, and B images may be generated with the electrical signals for each of the red, green, and blue imaging elements. In other words, the imaging unit 11 may generate the color image, the R image, the G image, and/or the B image, by one-time imaging (one shot).

FIG. 2 illustrates an example of the structure of the filter 21. The filter 21 has filter areas that transmit light rays of different wavelength bands (color components), respectively, and two or more filter areas are point-asymmetric with respect to an optical center 213 of the imaging device 11 (the lenses 31). The filter 21 includes, for example, filter areas of two colors: the first filter area 211 and the second filter area 212. The center of the filter 21 corresponds to the optical center 213 of the imaging device 11 (the lenses 31). Each of the first filter area 211 and the second filter area 212 has a shape point-asymmetric with respect to the optical center 213. For example, the two filter areas 211 and 212 do not overlap, and the two filter areas 211 and 212 constitute the entire area of the filter 21.

In the example illustrated in FIG. 2, each of the first filter area 211 and the second filter area 212 has a semicircular shape formed by dividing the circular filter 21 by a line (also referred to as a border line) 214 through the optical center 213. The first filter area 211 transmits, among the colors of light rays received by the image sensor 41 (for example, red (R), green (G), and blue (B)), colors of first combination (for example, red and green). The second filter area 212 transmits, among the colors of light rays received by the image sensor 41, colors of second combination (for example, blue and green) which is different from the first combination. Thus, the entire surface of the filter 21 including the first filter area 211 and the second filter area 212 transmits the common color of light rays (for example, green). For example, the first filter area 211 is a yellow (Y) filter area, and the second filter area 212 is a cyan (C) filter area. It should be noted that the first filter area 211 may be a magenta (M) filter area, and the second filter area 212 may be a yellow (Y) filter area. Furthermore, the first filter area 211 may be a cyan (C) filter area, and the second filter area 212 may be a magenta (M) filter area.

Those color filters transmit different wavelength bands, respectively. A part of a wavelength band of light rays that transmits one filter area may have, for example, an overlap with a part of a wavelength band of light rays that transmits another color filter area. A wavelength band of light rays that transmits one color filter area may include, for example, a wavelength band of light rays that transmits another color filter area.

It should be noted that each of the first filter area 211 and the second filter area 212 may be a filter that changes transmittance of a certain wavelength band, or a polarized filter that allows light rays polarized in certain directions to pass therethrough. Alternatively, each filter area may be a microlens that changes light-condensing power of a certain wavelength band. The filter that changes transmittance of a certain wavelength band may be, for example, a primary color filter (RGB), a complementary color filter (CMY), a color correction filter (CC-RGB/CMY), an infrared/ultraviolet cut filter, an ND filter, or a masking shield. In a case where the first filter area 211 and the second filter area 212 are microlenses, the lenses brings about biasing distribution of condensed light rays, thereby changing blur shapes.

For sake of simplicity, hereinafter mainly illustrated is a case where the first filter area 211 is a yellow (Y) filter area and the second filter area 212 is a cyan (C) filter area in the filter 21 illustrated in FIG. 2.

For example, in a case where the filter 21 illustrated in FIG. 2 is disposed at an aperture of the camera, a color aperture having a structure in which the aperture is divided into halves by two colors is realized. Based on light rays that transmit the color aperture, the image sensor 41 generates an image. The lens 31 may be disposed between the filter 21 and the image sensor 41 on an optical path of the light rays incident upon the image sensor 41. The filter 21 may be disposed between the lens 31 and the image sensor 41 on the optical path of the light rays incident upon the image sensor 41. In a case where multiple lenses 31 are provided, the filter 21 may be disposed between two of the lenses 31.

Light rays of a wavelength band corresponding to the second sensor 412 transmit both the first filter area 211 of yellow color and the second filter area 212 of cyan color. Light rays of a wavelength band corresponding to the first sensor 411 transmit the first filter area 211 of yellow color and do not transmit the second filter area 212 of cyan color. Light rays of a wavelength band corresponding to the third sensor 413 transmit the second filter area 212 of cyan color and do not transmit the first filter area 211 of yellow color.

The fact that light rays of a certain wavelength band transmit a filter or a filter area represents that the filter or the filter area transmits the light rays of the wavelength band with high transmittance, and the fact represents that attenuation of the light rays of the wavelength band due to the filter or the filter area (a decrease in light intensity) is extremely small. Furthermore, the fact that light rays having a certain wavelength band do not transmit a filter or a filter area represents that the light rays are shielded by the filter or the filter area: for example, the filter or the filter area transmits the light rays of the wavelength band with low transmittance, and the fact represents that attenuation of the light rays of the wavelength band due to the filter or the filter area is extremely large. For example, a filter or a filter area absorbs light rays of a certain wavelength band, thereby attenuating the light rays.

FIG. 3 illustrates exemplary transmittance characteristics of the first filter area 211 and the second filter area 212. Although transmittance with respect to light rays of a wavelength band longer than 700 nm in wavelength bands of visible light rays is not illustrated, it should be noted that the transmittance is close to transmittance with respect to a wavelength band of 700 nm. In a transmittance characteristic 215 of the first filter area 211 of yellow color illustrated in FIG. 3, light rays of a wavelength band from about 620 nm to 750 nm corresponding to the R image and light rays of a wavelength band from about 495 nm to 570 nm corresponding to the G image are transmitted with high transmittance, and light rays of a wavelength band from about 450 nm to 495 nm corresponding to the B image are hardly transmitted. In a transmittance characteristic 216 of the second filter area 212 of cyan color, the light rays of the wavelength band corresponding to the B image and the light rays of the wavelength band corresponding to the G image are transmitted with high transmittance, and the light rays of the wavelength band corresponding to the R image are hardly transmitted.

Therefore, the light rays of the wavelength band corresponding to the R image (the first sensor 411) transmit the first filter area 211 of yellow color, and the light rays of the wavelength band corresponding to the B image (the third sensor 413) transmit the second filter area 212 of cyan color. The light rays of the wavelength band corresponding to the G image (the second sensor 412) transmit both of the first filter area 211 and the second filter area 212.

Blur shapes of these R, G, B images change in accordance with a distance d to an object, more specifically, in accordance with a difference between the distance d and a focusing distance df. The focusing distance df is a distance from an imaging position to a focused position where an image is not blurred (that is, a position in focus). The filter areas 211 and 212 have a shape point-asymmetric with respect to the optical center 213 so that the blur shapes on the R and B images are different and slant depending on situations whether the object is on the near side or on the deep side from the focusing distance df. Directions of the slant in the blurs on the R and B images reverse depending on the situations whether the object is on the near side or the deep side from the focusing distance df as seen from the imaging position.

Now, a relationship between a change in light rays in the imaging unit 11 including the filter 21 and blur shapes on an image will be explained with reference to FIG. 4.

When an object 210 is on the deep side from the focusing distance df (d>df), images generated by the image sensor 41 are blurred. Blur functions (e.g., point spread functions: PSF) indicating blur shapes on the R, G, and B images are different. For example, a blur function 201R of the R image indicates a blur shape slanted to the left, a blur function 201G of the G image indicates a balanced blur shape, and a blur function 201B of the B image indicates a blur shape slanted to the right.

When the object 210 is at the focusing distance df (d=df), images captured by the image sensor 41 are hardly blurred. Blur functions indicating blur shapes on the R, G, and B images are substantially similar. In other words, a blur function 202R of the R image, a blur function 202G of the G image, and a blur function 202B of the B image indicate balanced blur shapes.

When the object 210 is on the near side from the focusing distance df (d<df), images captured by the image sensor 41 are blurred. Blur functions indicating blur shapes on the R, G, and B images are different. For example, a blur function 203R of the R image indicates a blur shape slanted to the right, a blur function 203G of the G image indicates a balanced blur shape, and a blur function 203B of the B image indicates a blur shape slanted to the left.

In this manner, when the object 210 is on the near side or on the deep side from the focusing distance df, the blur function 201R and the blur function 203R of the R image based on the light rays transmitting the first filter area 211 of yellow color are asymmetric, and the blur function 201B and the blur function 203B of the B image based on the light rays transmitting the second filter area 212 of cyan color are also asymmetric. The blur function 201R of the R image is different from the blur function 201B of the B image. The blur function 203R of the R image is different from the blur function 203B of the B image.

FIG. 5 illustrates a method for calculating (estimating) a distance to the object 210 using such blurs on the images. In the example illustrated in FIG. 5, the filter 21 includes the first filter area 211 of yellow color and the second filter area 212 of cyan color. Therefore, the light rays of the wavelength band corresponding to the R image transmit a portion 51R corresponding to the first filter area 211, the light rays of the wavelength band corresponding to the G image transmit a portion 51G corresponding to the first filter area 211 and the second filter area 212, and the light rays of the wavelength band corresponding to the B image transmit a portion 51B corresponding to the second filter area 212.

When images generated with the filter 21 are blurred, blur shapes of the R, G, and B images are different. As illustrated in FIG. 5, a blur function 52G of the G image indicates a bilaterally symmetric blur shape. A blur function 52R of the R image and a blur function 52B of the B image indicate point-asymmetric blur shapes, but the blurs slant differently.

Blur correction filters 53 and 54 are applied to the blur function 52R of the R image and the blur function 52B of the B image, respectively so as to correct point-asymmetric blurs on the R image and the B image to a bilaterally symmetric blur. Then, it is determined whether the blur function 52R and the blur function 52B after application of the blur correction filter 53 and 54 match the blur function 52G of the G image. Multiple blur correction filters 53 and 54 are prepared, and the blur correction filters 53 and 54 correspond to multiple distances to an object. When a blur function to which one of the blur correction filters 53 and 54 has been applied matches the blur function 52G of the G image, a distance corresponding to the one of the blur correction filters 53 and 54 is determined as a distance to the object 210.

In determining whether a blur function matches the blur function 52G, for example, a correlation between the G image and the R image or B image to which a certain blur correction filter has been applied is used. Therefore, for example, searching a blur correction filter, for which a correlation between the R image or B image to which the blur correction filter is applied and the G image is higher, from the blur correction filters achieves estimating the distance to the object captured in each pixel on the image.

As a correlation value indicating a correlation between the G image and the R image or B image to which a certain blur correction filter is applied, for example, Normalized Cross-Correlation (NCC), Zero-mean Normalized Cross-Correlation (ZNCC), Color Alignment Measure, or the like may be used.

Furthermore, in determining whether blur functions 55R or 55B to which a certain blur correction filter 53 or 54 is applied match the blur function 52G of the G image, the following difference may also be used: a difference between the G image and the R image or B image to which a certain blur correction filter has been applied. Searching a distance having lower difference achieves calculation of the distance to the object. As the difference, for example, Sum of Squared Difference (SSD), Sum of Absolute Difference (SAD) or the like may be used.

It may be determined whether a blur function of the R image to which the blur correction filter 53 has been applied matches a blur function of the B image to which the blur correction filter 54 has been applied. These blur correction filters 53 and 54 correspond to the same distance. When the blur function of the R image to which the blur correction filter 53 has been applied matches the blur function of the B image to which the blur correction filter 54 has been applied, a distance corresponding to those blur correction filters 53 and 54 is determined as the distance to the object 210.

In this manner, since a relative relationship of the blurs (for example, blur functions or blur shapes) on the two color component images has a correlation with the distance to the object, the image processing unit 12 may acquire the correlation in advance by calibration. The image processing unit 12 creates a look-up table (LUT) or a model by the calibration. The LUT or the model indicates a correspondence between a distance to an object and a blur correction amount for correcting a blur on one color component image to a blur on another color component image. For example, the image processing unit 12 creates an LUT or a model indicating a correspondence between a distance to an object and the blur correction filter 53 or 54 used to match the blur function of the R image or B image and the blur function of the G image. Instead of the blur correction amount, other values (parameters) such as magnitude of blurs indicating a relationship between a blur on one color component image and a blur on another color component image may be used. By referring to this LUT or model, it is possible to convert the blur correction amount into the distance to the object.

Figure 6:
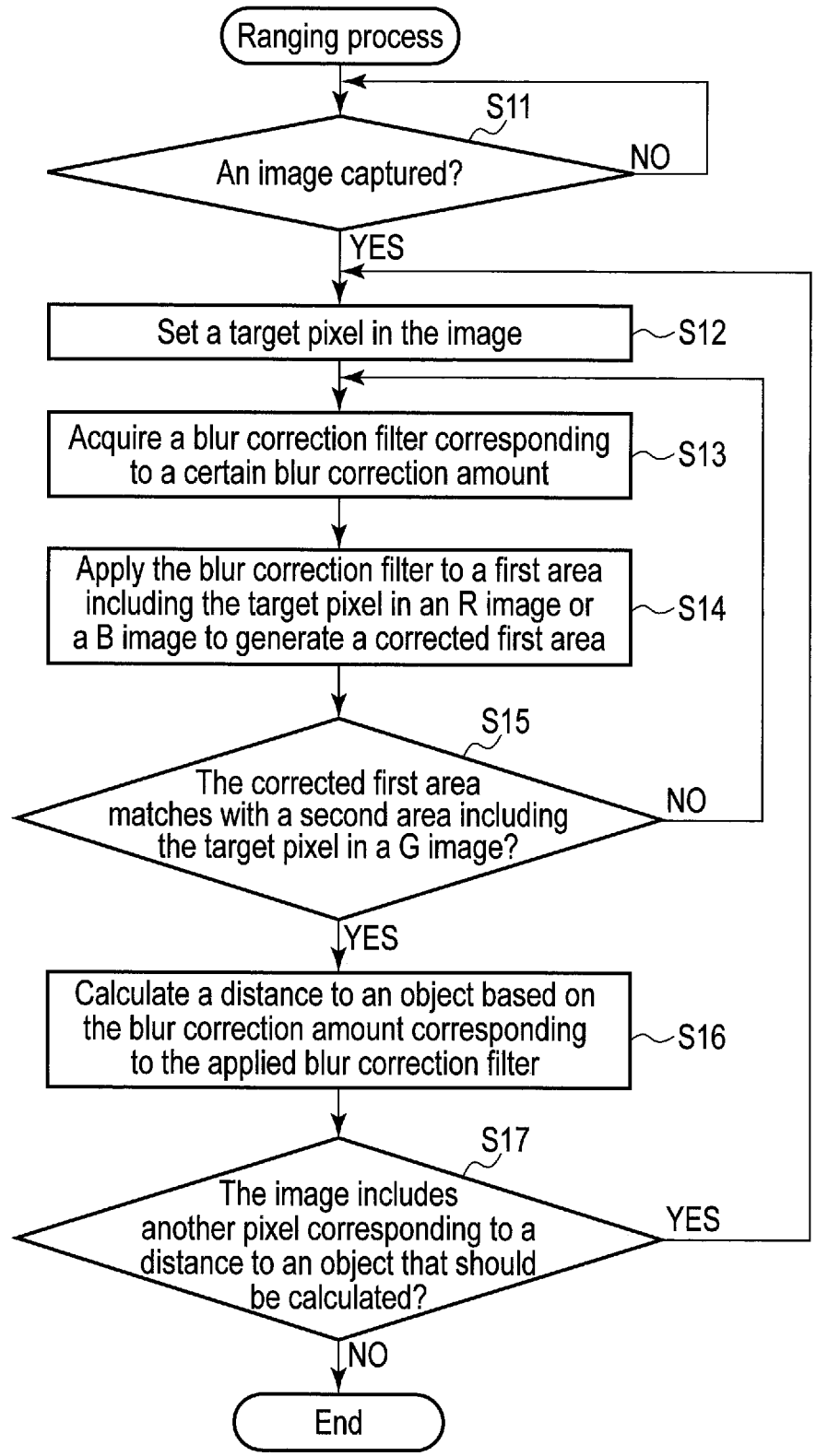
FIG. 6 is a flowchart illustrating an example of the procedure of a ranging process executed by the ranging device of FIG. 1.

FIG. 6 illustrates a flowchart of the procedure of a ranging process executed by the image processing unit 12. In the ranging process, an image generated by the imaging unit 11 is used to calculate a distance from a position of the imaging unit 11 at the time of generation of the image to an object captured in the image.

Firstly, the image processing unit 12 determines whether an image has been obtained from the imaging unit 11 (step S11). The image processing unit 12 determines that an image has been obtained from the imaging unit 11 when the imaging unit 11 has generated a new image, for example. Furthermore, the image processing unit 12 may obtain an image of one or more images that are generated by the imaging unit 11 and are stored in a storage or the like. When an image has not been obtained from the imaging unit 11 (NO in step S11), the process returns to step S11 and whether an image has been obtained from the imaging unit 11 is determined again.

When an image has been obtained from the imaging unit 11 (YES in step S11), the image processing unit 12 sets a target pixel in the obtained image (step S12). The target pixel may be set, for example, one by one from the upper left end pixel to the lower right pixel of the image in an order of raster scanning. Furthermore, each of pixels corresponding to an edge on the image may be set as the target pixel.

Then, the image processing unit 12 selects a blur correction filter corresponding to a blur correction amount (step S13). The image processing unit 12 selects one blur correction filter from multiple blur correction filters that correspond to multiple blur correction amounts, respectively, and are prepared beforehand, for example. The image processing unit 12 applies the selected blur correction filter to a first area including the target pixel in the R image or the B image to generate a corrected first area (step S14). The first area has a specific size, and the center of the first area corresponds to the target pixel, for example.

Then, the image processing unit 12 determines whether the corrected first area matches a second area including the target pixel in the G image (step S15). The second area and the first area have the same size. Note that the image processing unit 12 may determine, instead of determining whether the corrected first area matches the second area, whether a correlation between the corrected first area and the second area exceeds a first threshold value or whether a difference between the corrected first area and the second area is below a second threshold value. When the corrected first area and the second area do not match (NO in step S15), the process returns to step S13 and a process using another blur correction filter is performed.

When the corrected first area and the second area match (YES in step S15), the image processing unit 12 calculates a distance to the object (that is, the object captured in the target pixel) based on the blur correction amount corresponding to the applied blur correction filter (step S16). In the calculation, as stated above, an LUT or a model indicative of a correspondence between a blur correction amount and a distance to an object may be used.

Then, the image processing unit 12 determines whether the image includes another pixel corresponding to a distance to an object that should be calculated (step S17). When the image includes another pixel corresponding to a distance to an object that should be calculated (YES in step S17), the process returns to step S12 and a process to calculate the distance to the object captured in said another pixel is performed.

When the image does not include another pixel corresponding to a distance to an object that should be calculated (NO in step S17), the process ends.

Through the above process, the image processing unit 12 can calculate a distance to an object captured in each pixel of an image that is obtained by the imaging unit 11.

The filter 21 is, ideally, disposed at the aperture within the lens unit 3 to calculate an accurate distance to an object captured in the image. As illustrated in FIG. 7, a position of the aperture 3A in the lens unit 3 is determined based on the optical characteristics of each of one or more lenses 311, 312, and 313 disposed in the lens unit 3 and the optical design based on the arrangement of the lenses 311, 312, and 313, and the like. The aperture 3A is positioned between two lenses of the lenses 311, 312, and 313, is positioned between a first end 3E-1 of the lens unit 3 and the lens 311 (that is, the lens closest to the first end 3E-1), or is positioned between a second end 3E-2 of the lens unit 3 and the lens 313 (that is, the lens closest to the second end 3E-2).

If a lens unit includes the filter 21 positioned at the aperture 3A, for example, manufacturing a special lens unit in which the filter 21 is incorporated in the aperture 3A is needed, or adapting a commercially-available lens unit by disassembling it, inserting the filter 21 at the aperture 3A, and reassembling it is needed. Such a method is not versatile, and an ordinary user cannot easily use the lens unit that includes the filter 21 at the aperture 3A through such a method.

Furthermore, in a case where the edge of the object is orthogonal to the boundary line 214 between the first filter area 211 and the second filter area 212 (for example, in a case where a scene to be captured includes many edges orthogonal to the boundary line 214), an image that includes a blur corresponding to a distance to the object cannot be obtained. Thus, a ranging accuracy of calculating a distance to the object from the image is deteriorated. In that case, the orientation of the filter 21 is changed (that is, the filter 21 is rotated) such that the edge of the object does not become orthogonal to the boundary line 214 between the first filter area 211 and the second filter area 212, thereby obtaining an image from which a distance to the object can be accurately calculated.

Furthermore, the orientation of the filter 21 disposed at the aperture 3A within the lens unit 3 may be unintentionally shifted because of a shock or the like. However, the orientation of the filter 21 disposed at the aperture 3A is highly difficult to change for a user.

Thus, in the present embodiment, the filter 21 is disposed outside the lens unit 3. The filter 21 is disposed in a position that is outside the lens unit 3 and is apart from the aperture 3A by a distance D1. The distance D1 from the filter 21 to the aperture 3A is longer than a distance D2 from the first end 3E-1 of the lens unit 3 to the aperture 3A when the filter unit 2, which includes the filter 21, is attached to the first end 3E-1 of the lens unit 3. Thus, the filter unit 2 including the filter 21 can easily be attached to various types of lens units 3 (or cameras including the lens unit 3) without changing the structure of the lens unit 3. Furthermore, since the filter unit 2 is disposed outside the lens unit 3, a user easily manipulates the filter unit 2. More specifically, the user can easily adjust the orientation of the filter 21 in accordance with the edge on the object and the like.

Figure 8:
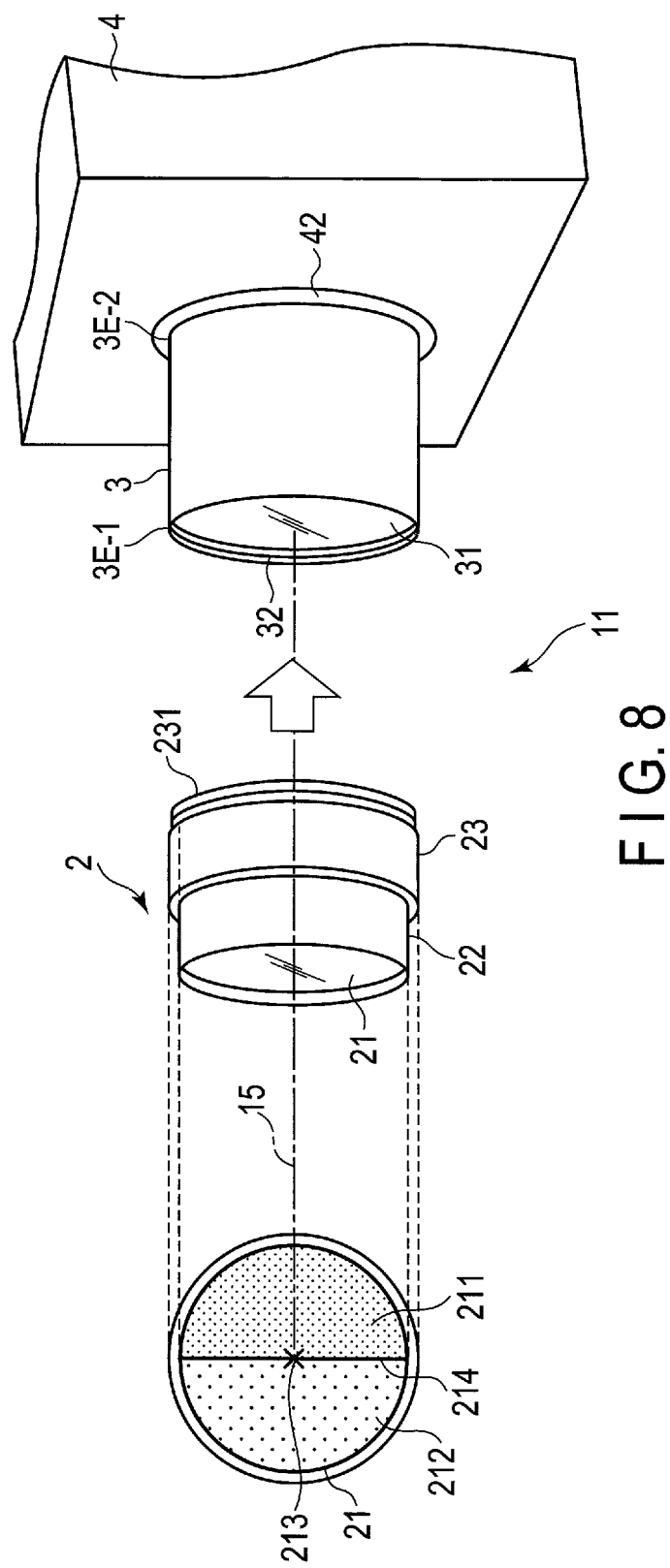
FIG. 8 is a perspective view illustrating an example of the structure of the imaging device of the first embodiment.

FIG. 8 illustrates an example of the structure of the imaging device 11 of the present embodiment. The imaging device 11 includes the filter unit 2 including the filter 21, the lens unit 3 including the one or more lenses 31, and the camera main body 4 including the image sensor 41. The filter unit 2 and the lens unit 3 are, for example, cylindrical. The imaging device 11 may be a ranging device 1 in which the image processing unit 12 is included in the camera main body 4. Furthermore, the display 13 may be incorporated into the camera main body 4. In the following description, in the imaging device 11, a direction from the camera main body 4 to the filter unit 2 will be referred to as front and the direction from the filter unit 2 to the camera main body 4 will be referred to as back for easier understanding.

On the front surface of the camera main body 4, a lens mount 42 to attach the lens unit 3 is disposed. To the lens mount 42, a body mount (which is not shown) disposed at the second end 3E-2 of the lens unit 3 is connected. Thus, the lens unit 3 is attached to the camera main body 4. In this example, the lens unit 3 is an interchangeable lens; however, the lens unit 3 may be integrated with the camera main body 4 as in a compact digital camera, a camera in a smartphone or a tablet PC, or the like.

The first end 3E-1 of the lens unit 3 includes a screw part 32 to hold the filter unit 2. In the lens unit 3 (interchangeable lens) for general purposes, the screw part 32 may be used to attach a protector to protect the lens 31 or various filters (for example, a UV cutting filter, a polarizer, and the like) to the lens unit 3.

The filter unit 2 includes a filter frame 22 holding the filter 21, and an attachment part 23 coupled with the filter frame 22. The filter frame 22 is, for example, cylindrical to hold the circular-shaped filter 21. The attachment part 23 is cylindrical to surround and support at least part of the filter frame 22.

Furthermore, the attachment part 23 is detachably attached to the first end 3E-1 of the lens unit 3. The attachment part 23 includes a screw part 231 to fix the filter unit 2 to the first end 3E-1 of the lens unit 3. The screw part 231 is screwed into the screw part 32 of the lens unit 3, and thus, the filter unit 2 is attached to the lens unit 3. That is, the attachment part 23 is fixed to the lens unit 3.

Note that the screw part 231 of the filter unit 2 may be screwed into a screw part 32 disposed in another filter or the like that is attached to the lens unit 3. That is, the filter unit 2 may be attached to the lens unit 3 with said another filter or the like interposed therebetween. The screw part 231 is used to attach the filter unit 2 to a cylindrical object having the corresponding screw part 32.

The filter frame 22 is rotatable about an optical axis 15 (that is, the optical center 213) of the lens unit 2 (i.e., the one or more lenses 31). That is, the filter 22 includes an adjustment mechanism to adjust the orientation of the filter 21 (that is, the angle in rotation direction) by rotating about the optical axis 15. Thus, a user can suitably change the orientation of the filter 21 in accordance with the edge of the object or the like by the rotation operation of the filter frame 22. The orientation of the filter 21 is determined by, for example, the direction of the boundary line 214 between the first filter area 211 and the second filter area 212 in the filter 21. In the following description, the direction of the boundary line 214 may be referred to as the orientation of the filter 21.

Figure 9:
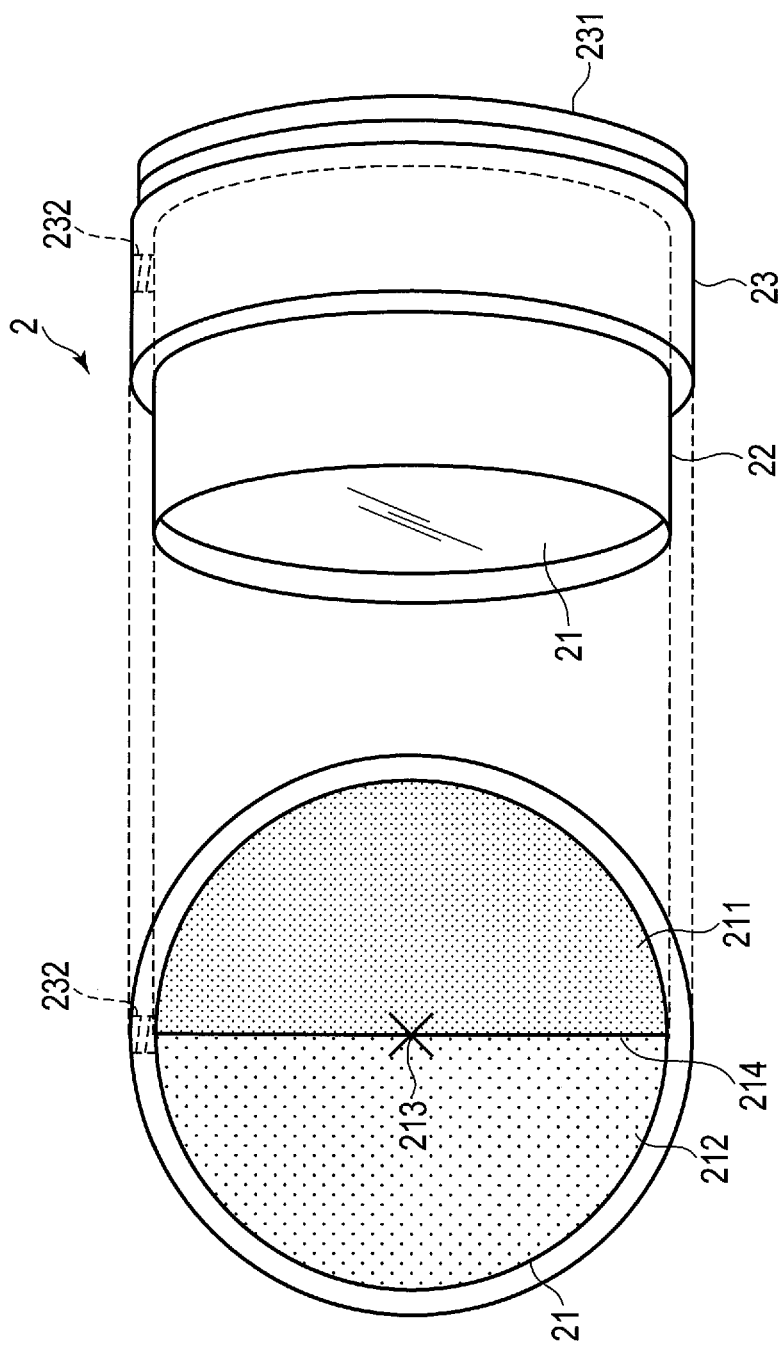
FIG. 9 is a perspective view illustrating an example where the orientation of the filter, which is included in the filter unit in the imaging device of the first embodiment, is fixed with a setscrew.

As illustrated in FIG. 9, the filter frame 22 is fixed to the attachment part 23 using the screw 232 as a fixing part that passes through the side surface of the attachment part 23. When the screw 232 is tightened, the filter frame 22 is fixed to the attachment part 23. On the other hand, when the screw 232 is loosened, the filter frame 22 becomes rotatable. The screw 232 is, for example, a setscrew head of which is the same size as the thread part.

Figure 10:
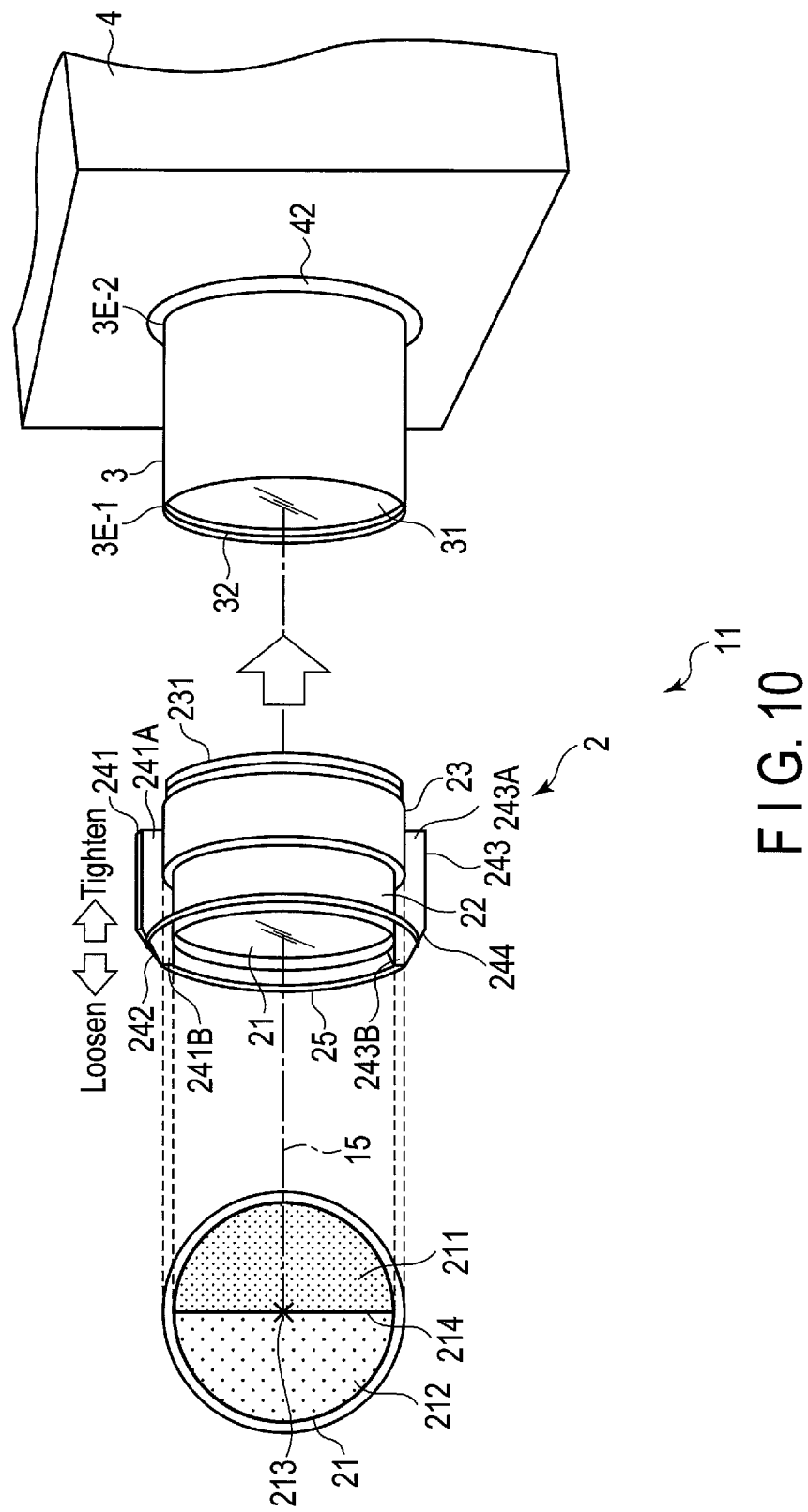
FIG. 10 is a perspective view illustrating an example where the orientation of the filter, which is included in the filter unit in the imaging device of the first embodiment, is fixed with a lock ring.

Alternatively, as illustrated in FIG. 10, the filter frame 22 may be fixed to the attachment part 23 using clamping parts 241 and 243, which are provided with the attachment part 23, and a lock ring 25 as the fixing parts. The clamping parts 241 and 243 are disposed such that they pinch the filter frame 22 from above and below. A base end 241A of the clamping part 241 is supported by (fixed to) the upper part of the attachment part 23 and continuously extends from the base end 241A to a tip end 241B that is in contact with the filter frame 22. A base end 243A of the clamping part 243 is supported by (fixed to) the lower part of the attachment part 23 and continuously extends from the base end 243A to a tip end 243B that is in contact with the filter frame 22.

The tip ends 241B and 243B include tapers 242 and 244, respectively, which have screw-shaped notches outside the optical axis 15. When the lock ring 25 having a similar screw-shaped notches therein is screwed into the screw-shaped notches of the tapers 242 and 244, the filter frame 22 is fixed to the attachment part 23. On the other hand, when the lock ring 25 is loosened, the filter frame 22 becomes rotatable.

The mechanism to fix the filter frame 22 to the attachment part 23 (fixing part) is not limited to the above structures. For example, a mechanism to temporarily fix the filter frame 22 to the attachment part 23 by a frictional force therebetween may be used, or a mechanism to produce a fixation force by pressing the filter frame 22 into the attachment part 23 may be used. That is, the frictional force with the attachment part 23 or the pressing with respect to the attachment part 23 may keep a position of the filter frame 22 with respect to the attachment part 23.

The filter unit 2 may further include a mechanism to adjust the position of the filter frame 22 with respect to the attachment part 23 after the filter frame 22 is fixed to the attachment part 23. The mechanism is, as in the example of FIG. 9, a fine-tuning screw that passes through the side surface of the attachment part 23 and may be in contact with the filter frame 22. There may be multiple fine-tuning screws to, for example, vertically and horizontally adjust (shift) the position of the filter frame 22 with respect to the attachment part 23. Thus, the position of the filter frame 22 with respect to the attachment part 23 is adjustable by tightening or loosening the fine-tuning screws.

FIG. 11 illustrates an example where the imaging device 11 further includes a structure to attach a lens hood 8. The lens hood 8 includes a screw part 81 in one end thereof. The lens hood 8 may have a proper orientation in which the lens hood 8 should be attached to the filter unit 2, as in a lens hood shape of which is other than a cylindrical shape (for example, a flower-shaped lens hood).

In front of the filter frame 22, a lens hood frame 29 to attach the lens hood 8 thereto is further disposed. A screw part 291 (attachment part) is disposed in, for example, the inside of the front end of the lens hood frame 29. When the screw part 81 of the lens hood 8 is screwed into the screw part 291, the lens hood 8 is attached to the lens hood frame 29.

The lens hood frame 29 can slide (is rotatable) about the optical axis 15 (that is, about the optical center 213). That is, the lens hood frame 29 is rotatable about the optical axis 15 to adjust the orientation of the lens hood 8. Thus, a user can suitably change the orientation of the lens hood 8 by rotating the lens hood frame 29.

With the above structures, the filter 21 can be easily attached in the imaging device 11. The filter 21 includes the first filter area 211 that transmits light rays of a first wavelength band and the second filter area 212 that transmits light rays of a second wavelength band. The first wavelength band and the second wavelength band include a common wavelength band. The filter frame 22 holds the filter 21. The attachment part 23 is coupled with the filter frame 22 and is detachably attached to the first end 3E-1 of the lens unit 3. When the attachment part 23 is attached to the first end 3E-1 of the lens unit 3, a distance from the filter 21 to the aperture 3A within the lens unit 3 is longer than a distance from the first end 3E-1 to the aperture 3A.

As can be understood from the above, the attachment part 23 coupled with the filter frame 22 is attached to the first end 3E-1 of the lens unit 3 and is detachable. Thus, in the imaging device 11, the filter 21 is easily attached and the orientation of the filter 21 is easily changeable.

Second Embodiment

In a second embodiment, the filter frame 22 of the imaging device 11 of the first embodiment has the center of gravity in a certain position. The structure of an imaging device 11 of the second embodiment is the same as the structure of the imaging device 11 of the first embodiment, and only the structure of the center of gravity of the filter frame 22 which is in a certain position is different between the first and second embodiments. In the following description, only the points different from the first embodiment will be explained.

Figure 12:
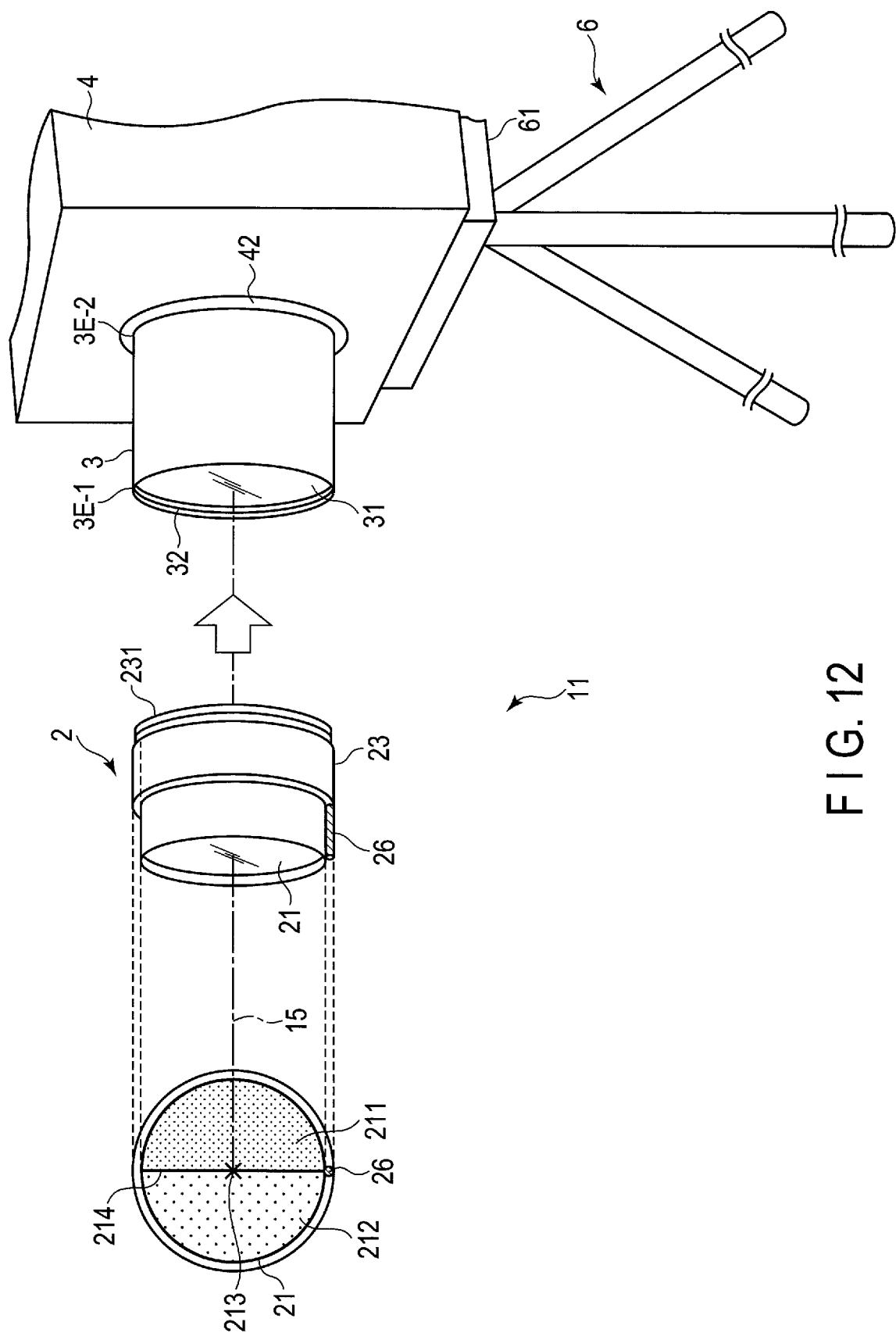
FIG. 12 is a perspective view illustrating an example of the structure of an imaging device according to a second embodiment.

FIG. 12 illustrates an example of the structure of the imaging device 11 of the second embodiment. The imaging device 11 is attached to a tripod 6 and is placed horizontally. Although this is not shown, when a screw provided with a platform 61 of the tripod 6 is screwed into a screw hole provided with the lower part of the camera main body 4, the camera main body 4 is fixed to the platform 61 of the tripod 6. The attached imaging device 11 is placed horizontally using a level included in the camera main body 4 or a level provided with the tripod 6 (for example, the platform 61). The imaging device 11 placed horizontally has a horizontal optical axis 15.

The attachment of the lens unit 3 to the camera main body 4 and the attachment of the filter unit 2 to the lens unit 3 are performed as in the first embodiment.

The filter frame 22 has the center of gravity at a position on the extension of the boundary line 214 between, for example, the first filter area 211 and the second filter area 212. In the example of FIG. 12, a weight 26 is disposed at a position that is in the outer regions of the filter frame 22 and is on the extension of the boundary line 214, and thus, the filter frame 22 has the center of gravity thereof at the position of the weight 26. The weight 26 is, for example, an iron ball.

As explained above, the filter frame 22 is rotatable about the optical axis 15. Thus, the filter frame 22 including the weight 26 rotates such that the weight 26 positions at the lower part of the vertical (plumb) direction. With the weight 26 positioned at the lower part of the vertical direction, the orientation of the boundary line 214 between the first filter area 211 and the second filter area 212 included in the filter 21 (that is, the orientation of the filter 21) becomes vertical. The rotated filter frame 22 may be fixed to the attachment part 23 using the above-described fixing part or the like of FIGS. 9 and 10. The imaging device 11 placed horizontally has the horizontal optical axis 15. That is, the boundary line 214 of the filter 21 is vertical, and the optical axis 15 is horizontal. Thus, slant in a blur in each of an R image and a B image generated by the image sensor 41 may occur in a horizontal direction (that is, the X-axis direction on the image) (cf. the R images 201R and 203R and the B images 201B and 203B of FIG. 4).

In that case, the image processing unit 12 can easily calculate a distance to the object in the image by using blur correction filters prepared on the premise that the slant in the blurs of images occurs in the horizontal direction.

The shift of the orientation of the filter 21 from an imagined direction may deteriorate the ranging accuracy by the image processing unit 12. In order to raise the ranging accuracy, the orientation of the filter 21 at the time of imaging must be set to match the direction of the premised slant in the blurs in images.

When the filter frame 22 having the center of gravity (weight 26) at a position on the extension of the boundary line 214 is used, the orientation of the filter 21 (the boundary line 214) can easily be set in the vertical direction. Thus, in a case where blur correction filters are prepared on the premise that the slant in the blurs in R image and B image occurs in the horizontal direction, an image in which the intended horizontal slant in the blurs occurs can be obtained.

The filter frame 22 may have the center of gravity at a position on the extension of a line obtained by rotating the boundary line 214 between the first filter area 211 and the second filter area 212 by a specific angle (for example, 45 degrees, 90 degrees, or the like) about the optical axis 15. That is, the weight 26 may be disposed at a certain position in the outer regions of the filter frame 22.

For example, when a distance to an edge in the horizontal direction on the object is to be measured, the filter frame 22 is structured such that the center of gravity (the weight 26) is positioned on the extension of the line that is obtained by rotating the boundary line 214 by 90 degrees (that is, the line in the horizontal direction). Thus, the slant in the blurs in the R and B images occurs in the vertical direction, and the distance to the edge in the horizontal direction on the object can easily be calculated using the blur correction filters prepared on the premise that the slant in the blurs in the R and B images occurs in the vertical direction.

Note that, when the filter 21 includes filter areas of three or more colors, the filter frame 22 may include the center of gravity (the weight 26) at a position on the extension of the boundary line of any of two filter areas. Furthermore, the filter frame 22 may include the center of gravity at a position on the extension of a line obtained by rotating the boundary line by a specific angle about the optical axis 15. Note that the filter frame 22 may be structured such that a user can move a position of the weight 26.

As described above, the orientation of the filter 21 can be accurately adjusted with the hardware structure. With the adjustable orientation of the filter 21, an image with ideal blurs (intentional blurs) can be obtained using the imaging device 11.

Third Embodiment

In a third embodiment, the filter frame 22 of the imaging device 11 of the first and second embodiments includes a posture sensor that detects a posture of the filter 21. The structure of an imaging device 11 of the third embodiment is the same as the structure of the imaging device 11 of the first and second embodiments, and only the structure of the posture sensor in the filter frame 22 is different between the third embodiment and the first and second embodiments. In the following description, only the points different from the first and second embodiments will be explained.

Figure 13:
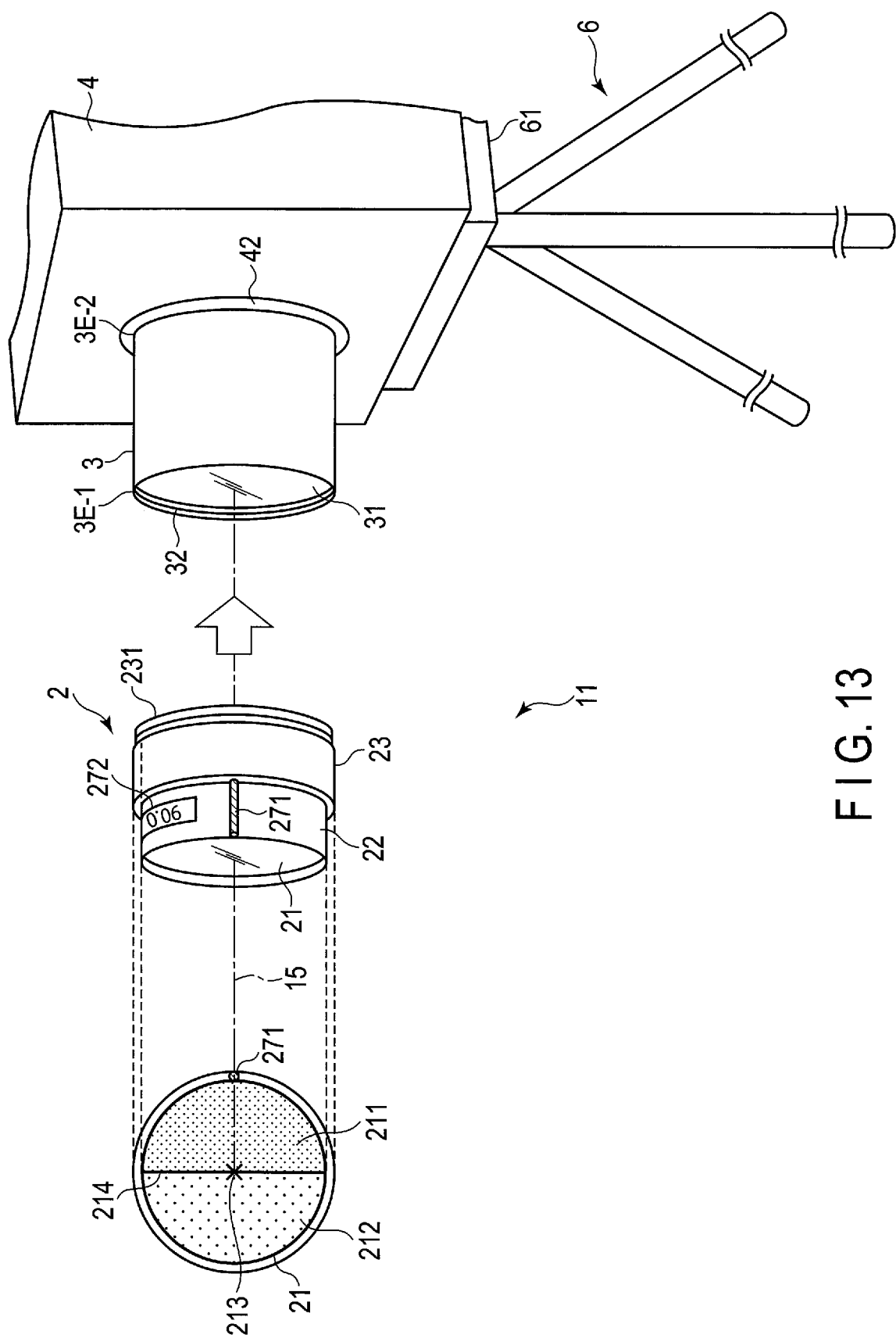
FIG. 13 is a perspective view illustrating an example of the structure of an imaging device according to a third embodiment.

FIG. 13 illustrates an example of the structure of the imaging device 11 of the third embodiment. The imaging device 11 is attached to the tripod 6 and is placed horizontally. Although this is not shown, when a screw provided with the platform 61 of the tripod 6 is screwed into a screw hole provided with the lower part of the camera main body 4, the camera main body 4 is fixed to the platform 61 of the tripod 6. The attached imaging device 11 is placed horizontally using a level included in the camera main body 4 or a level provided with the tripod 6 (for example, the platform 61). The imaging device 11 placed horizontally has a horizontal optical axis 15.

The attachment of the lens unit 3 to the camera main body 4 and the attachment of the filter unit 2 to the lens unit 3 are performed as in the first embodiment.

The filter frame 22 includes a posture sensor 271 that detects the orientation of the filter 21 held by the filter frame 22. The posture sensor 271 is, for example, a six-axes gyro sensor that detects angles of yaw, roll, pitch, and the like. The posture sensor 271 detects a rotation angle of the filter 21 about the optical axis 15. The filter frame 22 includes a control circuit for power supply and control together with the posture sensor 271.

Furthermore, an indicator 272 is disposed on the outer peripheral surface of the filter frame 22. The indicator 272 is a display (for example, an LCD, an OLED, an electronic paper, or a 7-segment LED display) to display, for example, an angle detected by the posture sensor 271. The control circuit displays the angle detected by the posture sensor 271.

As described above, the filter frame 22 is rotatable about the optical axis 15. A user operates the rotation of the filter frame 22 such that the filter 21 is set to a specific orientation based on the angle that indicates the orientation of the filter 21 and is displayed on the indicator 272. The rotated filter frame 22 may be fixed to the attachment part 23 using the above-described fixing part of FIGS. 9 and 10 or the like.

The indicator 272 may be an LED that illuminates when the filter 21 is set in a specific orientation. In that case, the control circuit turns on the indicator 272 when the angle detected by the posture sensor 271 becomes a specific angle and turns off the indicator 272 while the angle is out of the specific angle. A user rotates the filter frame 22 such that the filter 21 is set in the specific orientation based on the turning on/off of the indicator 272.

Instead of the indicator 272 or in addition to the indicator 272, the filter frame 22 may include a communication module that sends the angle detected by the posture sensor 271 to an electronic device such as a smartphone of the user or the like. The communication module is incorporated in, for example, the above-described control circuit to transmit data including the angle to the electronic device via wireless communication such as Bluetooth (registered trademark). In that case, the transmitted data is used to display the angle on a screen of the electronic device, and a user rotates the filter frame 22 such that the filter 21 is set in a specific orientation based on the displayed angle.

By rotating the filter frame 22 based on the angle detected by the posture sensor 271, the orientation of the filter 21 (the boundary line 214) can easily be set to a certain direction such as a vertical direction or a horizontal direction.

For example, a case where the orientation of the filter 21 is set to the vertical direction is considered. As described above, the imaging device 11 placed horizontally has a horizontal optical axis 15. That is, the boundary line 214 of the filter 21 is vertical, and the optical axis 15 is horizontal. Thus, the slant in the blurs in R image and B image generated by the image sensor 41 may occur in the horizontal direction (that is, the X-axis direction on the image) (cf. the R images 201R and 203R and the B images 201B and 203B of FIG. 4).

In that case, the image processing unit 12 can easily calculate a distance to the object in the image using blur correction filters prepared on the premise that the slant in the blurs occurs in the horizontal direction.

As can be understood from the above, based on the angle detected by the posture sensor 271, the orientation of the filter 21 can easily be set in the vertical direction. Thus, in a case where blur correction filters are prepared on the premise that the slant in the blurs in R image and B image occurs in the horizontal direction, an image in which the intended horizontal slant in the blurs occurs can be obtained.

As described above, the orientation of the filter 21 can be accurately adjusted with the hardware structure. With the adjustable orientation of the filter, the imaging device 11 can obtain an image with ideal blurs (intentional blurs). In the imaging device 11 of the third embodiment, the orientation of the filter 21 can easily be adjusted in a certain angle as compared to the imaging device 11 of the second embodiment that uses the weight 26.

Fourth Embodiment

In a fourth embodiment, the filter frame 22 of the imaging device 11 of the first to third embodiments includes an index (guide) to adjust the orientation of the filter 21. The structure of an imaging device 11 of the fourth embodiment is the same as the structure of the imaging device 11 of the first to third embodiments, and only the structure of the index of the filter frame 22 is different between the fourth embodiment and the first to third embodiments. In the following description, only the points different from the first to third embodiments will be explained.

Figure 14:
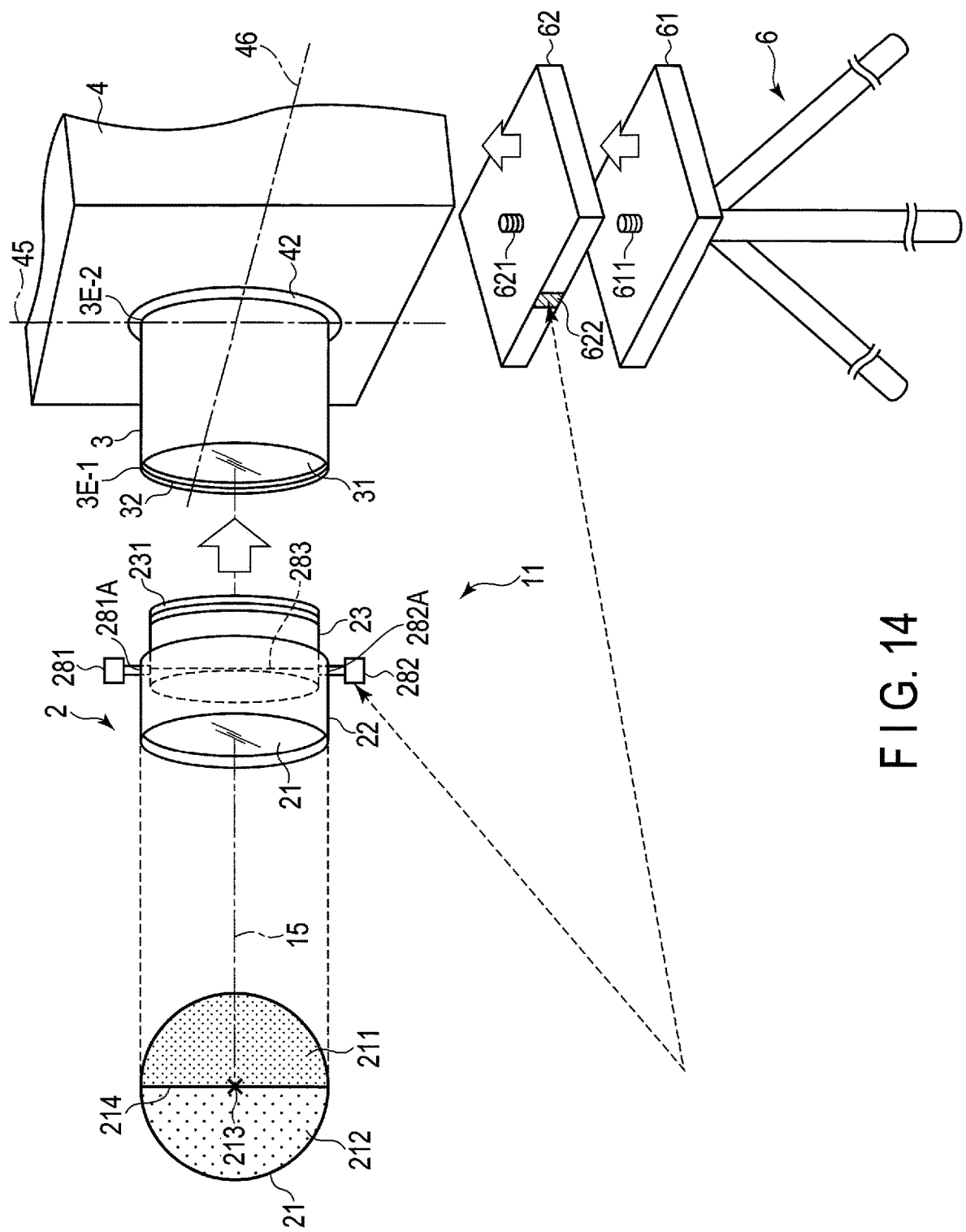
FIG. 14 is a perspective view illustrating an example of the structure of an imaging device according to a fourth embodiment.

FIG. 14 illustrates an example of the structure of the imaging device 11 of the fourth embodiment. The imaging device 11 is attached to a pedestal 62. For example, the camera main body 4 is fixed to the pedestal 62 by screwing a screw 621 provided with the pedestal 62 into the screw hole (not shown) disposed in the lower surface of the camera main body 4. The screw hole in the lower surface of the camera main body 4 is used to attach the camera main body 4 to the platform 61 by screwing the screw 611 provided with the platform 61 of the tripod 6, for example. At a position in the pedestal 62 which is visible when the imaging device 11 is viewed from the front (for example, the center of the front surface of the pedestal 62), a filter angle index (guide) 622 to adjust the orientation of the filter 21 (for example, the direction of the boundary line 214 of the filter 21) in a specific direction is disposed.

The attachment of the lens unit 3 to the camera main body 4 and the attachment of the filter unit 2 to the lens unit 3 are performed as in the first embodiment.

The filter frame 22 is cylindrical to surround and support at least part of the attachment part 23. The filter unit 2 further includes two guide screws 281 and 282 that pass through the side surface of the filter frame 22. The guide screw 281 is formed such that a screw head thereof is larger than the thread part thereof to be recognizable when the screw head is used as a guide to adjust the orientation of the filter 21 in a specific direction.

In the filter frame 22, screw holes 281A and 282A through which the two guide screws 281 and 282 pass are disposed in the back side of the filter 21, for example. When the guide screws 281 and 282 are tightened, the guide screws 281 and 282 are in contact with the attachment part 23 from opposite two directions to fix the filter frame 22 to the attachment part 23. On the other hand, when the filter frame 22 is not fixed to the attachment part 23 with the guide screws 281 and 282, the guide screws 281 and 282 move in accordance with the rotation of the filter frame 22.

The guide screws 281 and 282 and the screw holes 281A and 282A are arranged such that a line 283 connecting the screw hole 281A and the screw hole 282A forms a specific angle with respect to the boundary line 214 in the filter 21. For example, when an image is captured while the direction of the boundary line 214 in the filter 21 is matched with the vertical direction 45 of the camera main body 4 (specifically, the image sensor 41), the line 283 connecting the screw hole 281A and the screw hole 281B is parallel with the boundary line 214. Furthermore, for example, when an image is captured while the boundary line 214 in the filter 21 is matched with the horizontal direction 46 of the camera main body 4, the line 283 connecting the screw hole 281A and the screw hole 281B is orthogonal to the boundary line 214.

FIG. 14 illustrates the guide screws 281 and 282, the screw holes 281A and 282A, and the index 622 of the pedestal 62 in order to set the boundary line 214 in the filter 21 to the vertical direction 45. A user rotates the filter frame 22 such that the guide screws 281 and 282 (the guide screw 282 in FIG. 14) match the index 622 while viewing the imaging device 11 from the front. Specifically, the user rotates the filter frame 22 such that the guide screws 281 and 282 and the index 622 are positioned linearly in the vertical direction 45 while viewing the imaging device 11 from the front. That is, the guide screws 281 and 282 are used as indices such that the guide screws 281 and 282 and the index 622 of the pedestal 62 attached to the imaging device 11 are positioned linearly when rotating the filter frame 22. The rotated filter frame 22 is fixed to the attachment part 23 by tightening the guide screws 281 and 282.

The pedestal 62 may be attached to the tripod 6. When the screw 611 provided with the platform 61 of the tripod 6 is screwed into a screw hole (not shown) provided with the lower surface of the pedestal 62, the pedestal 62 is fixed to the platform 61 of the tripod 6. The attached imaging device 11 is placed horizontally using a level included in the camera main body 4 or a level provided with the tripod 6 (for example, the platform 61); however, the imaging device 11 is not necessarily placed horizontally. The imaging device 11 placed horizontally has the horizontal optical axis 15.

Alternatively, the camera main body 4 may be detached from the pedestal 62 after the orientation of the filter 21 is adjusted using the guide screws 281 and 282 and the index 622 and the filter frame 22 is fixed. Then, the camera main body 4 may be attached to the tripod 6.

Furthermore, an index may be provided with the camera main body 4 instead of the index provided with the pedestal 62. For example, a sticker, which includes an index and has a shape corresponding to the shape of the already-known camera main body 4, may be supplied. A user attaches the sticker on the camera main body 4 (for example, the front of the camera main body 4), and rotates the filter frame 22 such that the guide screws 281 and 282 are matched with the index of the sticker while viewing the imaging device 11 from the front.

By rotating the filter frame 22 such that the guide screws 281 and 282 are matched with the index provided with the pedestal 62 or the camera main body 4, the orientation of the filter 21 can easily be set to a certain direction such as the vertical direction 45 or the horizontal direction 46 of the camera main body 4.

For example, a case where the direction of the boundary line 214 in the filter 21 is matched with the vertical direction 45 of the camera main body 4 is considered. The direction of the boundary line 214 is matched with the vertical direction 45 of the camera main body 4, the slant in the blurs in R image and B image generated by the image sensor 41 may occur in the horizontal direction 46 (that is, the X-axis direction on the image) (cf. the R images 201R and 203R and the B images 201B and 203B of FIG. 4).

In that case, the image processing unit 12 can easily be calculate a distance to the object in the image by using blur correction filters prepared on the premise of the slant in the blurs occurring in the horizontal direction.

As can be understood from the above, with the guide screws 281 and 282 and the index provided with the pedestal 62 or the camera main body 4, the orientation of the filter 21 can easily be set in the vertical direction 45. Thus, when blur correction filters are prepared on the premise of the slant in the blurs occurring in the horizontal direction 46 in R image and B image, an image in which the slant in the blurs occurs in the intended horizontal direction 46 can be obtained.

As described above, the orientation of the filter 21 can be accurately adjusted with the hardware structure. With the adjustable orientation of the filter 21, an image with ideal blurs (intentional blurs) can be obtained using the imaging device 11.

Fifth Embodiment

In a fifth embodiment, the imaging device 11 of the first to fourth embodiments further includes a mount adapter that has an index to adjust the orientation of the filter 21. The structure of an imaging device 11 of the fifth embodiment is the same as the structure of the imaging device 11 of the first to fourth embodiments, and only the mount adapter having an index is different between the fifth embodiment and the first to fourth embodiments. In the following description, only the points different from the first to fourth embodiments will be explained.

Figure 15:
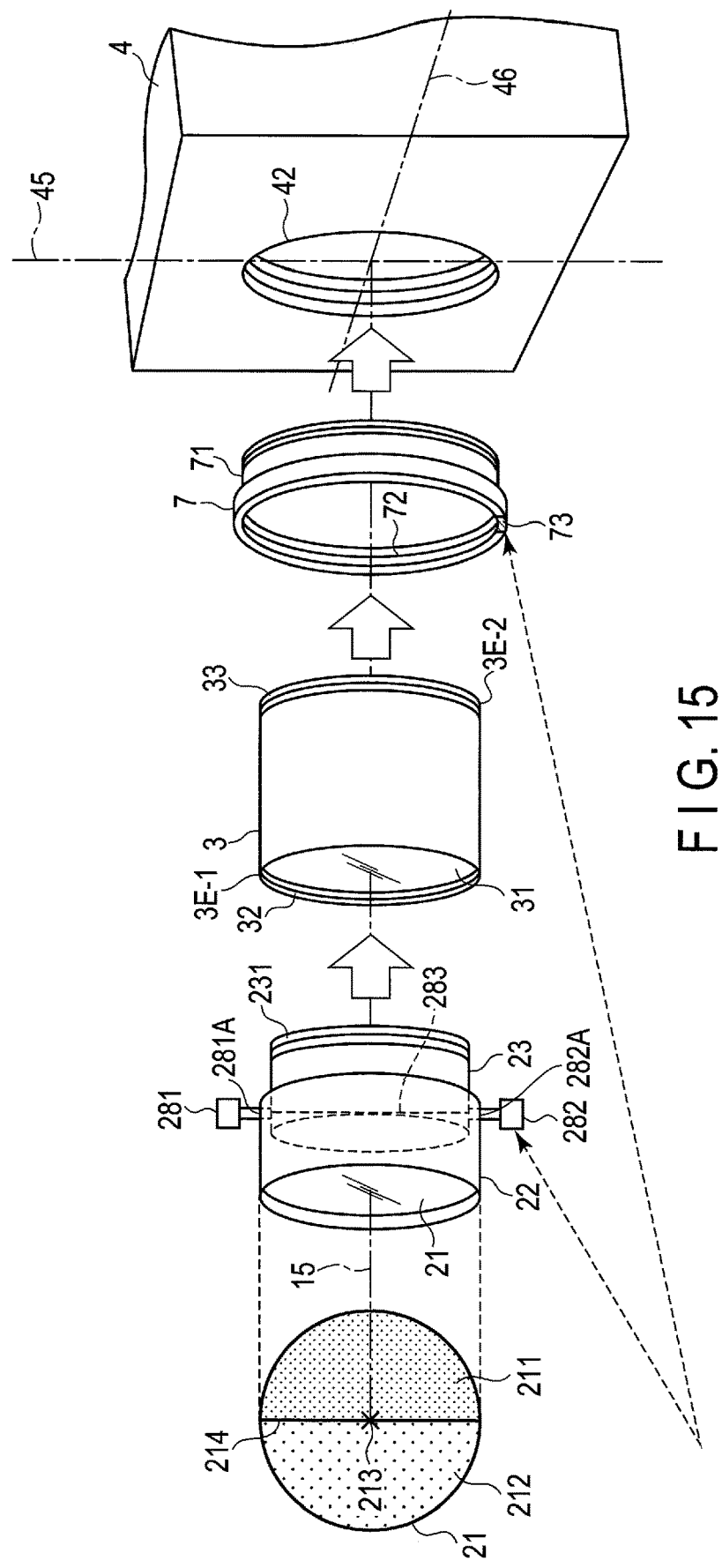
FIG. 15 is a perspective view illustrating an example of the structure of an imaging device according to a fifth embodiment.

FIG. 15 illustrates an example of the structure of the imaging device 11 of the fifth embodiment. The imaging device 11 includes a mount adapter 7. The mount adapter 7 is attached to the camera main body 4, and the lens unit 3 is attached to the mount adapter 7. The mount adapter 7 includes a screw part 71 to attach the mount adapter 7 to the lens mount 42 of the camera main body 4 in a one end thereof, and includes a screw part 72 to attach the lens unit 3 to the mount adapter 7 in the other end thereof.

The screw part 71 of the one end of the mount adapter 7 is connected to the lens mount 42. Thus, the mount adapter 7 is attached to the camera main body 4.

The screw part 72 of the other end of the mount adapter 7 is connected to a screw part 33 (body mount) in the second end 3E-2 of the lens unit 3. Thus, the lens unit 3 is attached to the mount adapter 7.

Furthermore, the mount adapter 7 includes an index 73, which is used for adjusting the direction of the boundary line 214 in the filter 21 to a specific direction, in a position visible when the imaging device 11 is viewed from the front (for example, the front surface). The position of the index 73 on the mount adapter 7 is set such that the mount adapter 7 indicates a specific direction when being mounted on the camera main body 7.

The structure of the filter unit 2 and the attachment of the filter unit 2 to the lens unit 3 are performed as in the fourth embodiment.

FIG. 15 illustrates the guide screws 281 and 282, the screw holes 281A and 282A, and the index 73 of the mount adapter 7 in order to set the boundary line 214 in the filter 21 (the orientation of the filter 21) to the vertical direction 45. A user rotates the filter frame 22 such that the guide screws 281 and 282 (the guide screw 282 in FIG. 15) match the index 73 while viewing the imaging device 11 from the front. Specifically, the user rotates the filter frame 22 such that the guide screws 281 and 282 and the index 73 are positioned linearly in the vertical direction 45 while viewing the imaging device 11 from the front. The rotated filter frame 22 is fixed to the attachment part 23 by tightening the guide screws 281 and 282.

By rotating the filter frame 22 such that the guide screws 281 and 282 are matched with the index 73 provided with the mount adapter 7, the direction of the boundary line 214 in the filter 21 can easily be set to a certain direction such as the vertical direction 45 or the horizontal direction 46 of the camera main body 4.

For example, a case where the direction of the boundary line 214 in the filter 21 is matched with the vertical direction 45 of the camera main body 4 is considered. The direction of the boundary line 214 is matched with the vertical direction 45 of the camera main body 4, the slant in the blurs in R image and B image generated by the image sensor 41 may occur in the horizontal direction 46 (that is, the X-axis direction on the image) (cf. the R images 201R and 203R and the B images 201B and 203B of FIG. 4).

In that case, the image processing unit 12 can easily calculate a distance to the object in the image by using a blur correction filter prepared on the premise of the slant in the blurs occurring in the horizontal direction 46.

As can be understood from the above, with the guide screws 281 and 282 and the index 73 provided with the mount adapter 7, the orientation of the boundary line 214 in the filter 21 can easily be set in the vertical direction 45. Thus, when blur correction filters are prepared on the premise of the slant in the blurs occurring in the horizontal direction 46 in R image and B image, an image in which the slant in the blurs occurs in the intended horizontal direction 46 can be obtained.

Note that the mount adapter 7 may be detached after the orientation of the filter 21 is adjusted using the guide screws 281 and 282 and the index 73 and the filter frame 22 is fixed. That is, the lens unit 3 may be directly mounted on the camera main body 4. However, if there is no proof that the orientation of the filter 21 is maintained with or without the mount adapter 7, the mount adapter 7 is kept attached.

As described above, the orientation of the filter 21 can be accurately adjusted with the hardware structure. With the adjustable orientation of the filter 21, an image with ideal blurs (intentional blurs) can be obtained using the imaging device 11.

Sixth Embodiment

In a sixth embodiment, the filter unit 2 of the imaging device 11 of the first to fifth embodiments has a clip shape. The structure of an imaging device 11 of the sixth embodiment is the same as the structure of the imaging device 11 of the first to fifth embodiments, and only the clip shape of the filter unit 2 is different between the sixth embodiment and the first to fifth embodiments. In the following description, only the points different from the first to fifth embodiments will be explained.

FIG. 16 illustrates an example of the structure of the imaging device 11 of the sixth embodiment. In this example, a case where the imaging device 11 is realized as a combination of a smartphone 1A including the lens unit 3 and the image sensor 41 and a filter unit 2A having a clip shape is considered. The smartphone 1A is an example, and any electronic device to which a clip-shaped filter unit 2A is attached to overlap the lens unit 3 (the lenses 31) can be adopted. The electronic device may be, for example, a camera main body 4 to which the lens unit 3 is attached and an electronic device including the lens unit 3 (for example, a tablet PC).

The smartphone 1A may include the image processing unit 12 and the display 13. In that case, the smartphone 1A with the filter unit 2 may be used not only as the imaging device 11 but also as the ranging device 1.

Figure 16A:
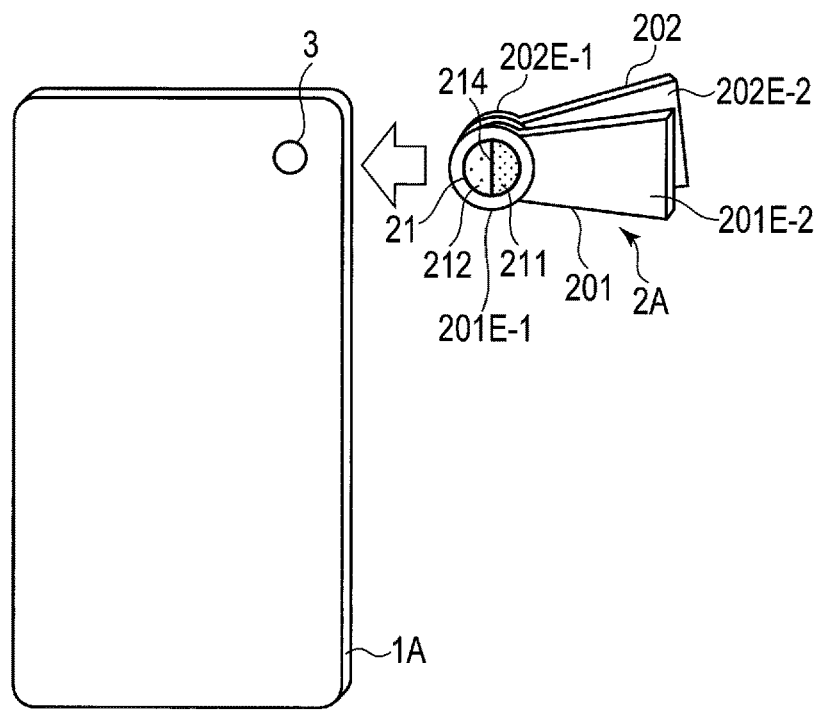
FIG. 16A is a perspective view illustrating an example of the structure of an imaging device according to a sixth embodiment.

As illustrated in FIG. 16A, the clip-shaped filter unit 2A includes two clip parts 201 and 202 to pinch the casing of the smartphone 1A. The clip parts 201 and 202 are the fixation pars to fix the filter unit 2A to the casing of the smartphone 1A. A first end 201E-1 of the clip part 201 has a thin cylindrical shape holding the filer 21. A first end 202E-1 of the clip part 202 has a similar thin cylindrical shape but does not hold the filter 21.

By applying a force to a second end 201E-2 of the clip part 201 and a second end 202E-2 of the clip part 202 to pinch them from the outside, the first end 201E-1 of the clip part 201 and the first end 202E-1 of the clip part 202 are opened. When a force is not applied to the second end 201E-2 of the clip part 201 and the second end 202E-2 of the clip part 202, the first end 201E-1 of the clip part 201 and the first end 202E-1 of the clip part 202 are closed.

Figure 16B:
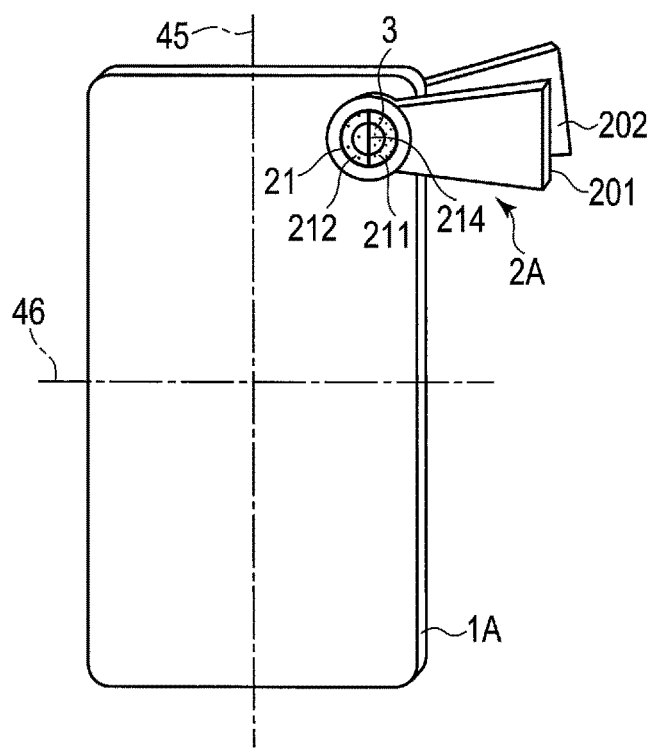
FIG. 16B is another perspective view illustrating the example of the structure of the imaging device of the sixth embodiment.

As illustrated in FIG. 16B, a user applies a force to the second end 201E-2 of the clip part 201 and the second end 202E-2 of the clip part 202 to pinch them from the outside to open the first ends 201E-1 and 202E-1, and pinches the smartphone 1A between the first ends 201E-1 and 202E-1 such that the filter 21 covers the lens unit 3.

The user may further adjust the position and the orientation of the first ends 201E-1 and 202E-1 holding the smartphone 1A. For such adjustment, a fine adjustment stage for the movement and the rotation may be incorporated into the first ends 201E-1 and 202E-1. The fine adjustment stage includes a fine-tuning screw to shift the first ends 201E-1 and 202E-1 in the horizontal and vertical directions, for example.

The user performs the adjustment such that the lens unit 3 (specifically, the lenses 31 included in the lens unit 3) and the filter 21 are connected in an optically-correct manner. Specifically, the user moves the first ends 201E-1 and 202E-1 such that the center of the filter 21 is positioned on the optical axis 15 (that is, on the center of the lens unit 3).

The user may further rotate the first ends 201E-1 and 202E-1 such that the direction of the boundary line 214 in the filter 21 is set to a specific direction such as the vertical direction 45, the horizontal direction 46, or the like of the smartphone 1A. At that time, a guide to set the direction of the boundary line 214 of the filter 21 to a specific direction may be displayed in a screen of the display 13 of the smartphone 1A.

Figure 17:
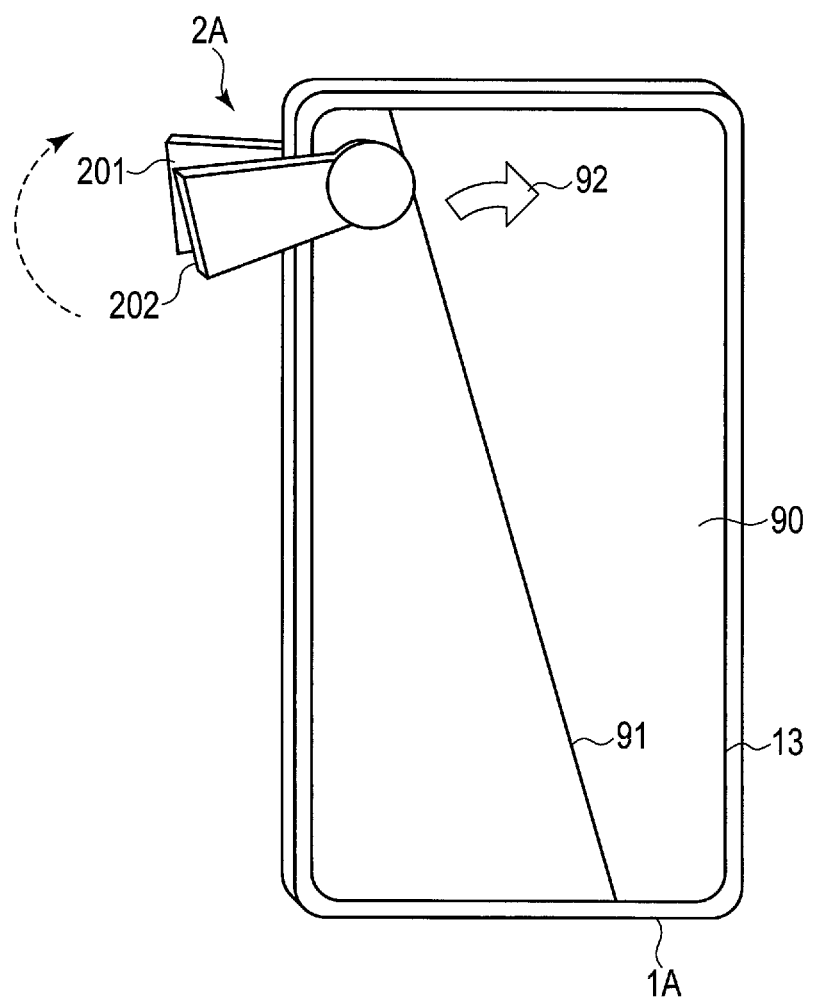
FIG. 17 is a view illustrating an example of a guide screen displayed on a display of the imaging device of the sixth embodiment.

FIG. 17 illustrates an example of a guide screen 90 displayed on the display 13. The guide screen 90 shows, for example, a line 91 indicative of a current direction of the boundary line 214 in the filter 21 and a rotation direction 92 (the clockwise direction in this example) of the filter unit 2 to set the current direction of the boundary line 214 to a specific direction (the vertical direction 45 in this example). With the guide screen 90, the user can easily adjust the orientation of the filter 21.

Note that the shape and the structure of the filter unit 2A may be optional as long as the filter unit 2A can be attached to the casing or the like of the smartphone 1A including the lens unit 3.

Figure 18:
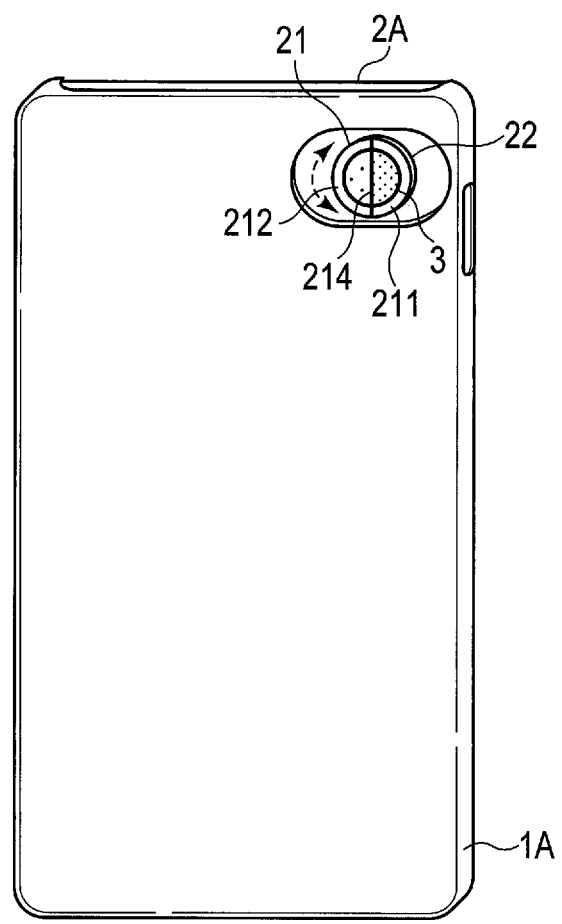
FIG. 18 is a perspective view illustrating another example of the structure of the imaging device of the sixth embodiment.

For example, as illustrated in FIG. 18, the filter unit 2A may have a shape of a case (or a cover) in which the whole casing of the smartphone 1A including the lens unit 3 is fit and attached. In the case-shaped filter unit 2A, the filter frame 22 holding the filter 21 is disposed in a position overlapping the lens unit 3 when being attached to the smartphone 1A. The filter frame 22 is rotatable, and the user can adjust the orientation of the filter 21 in a certain direction.

With the above structure, even if the lens unit 3 does not have a structure to attach the filter unit 2, the filter unit 2 can be attached to the casing including the lens unit 3 to overlap with the lens unit 3, and thus, the orientation of the filter 21 can be accurately adjusted with the hardware structure. With the adjustable orientation of the filter 21, an image with ideal blurs (intentional blurs) can be obtained using the imaging device 11 (for example, smartphone 1A).

As explained above, according to the first to sixth embodiments, an optical filter can easily be attached. The filter 21 includes the first filter area 211 that transmits light rays of a first wavelength band and the second filter area 212 that transmits light rays of a second wavelength band. The first wavelength band and the second wavelength band include a common wavelength band. The filter frame 22 holds the filter 21. The attachment part 23 is coupled with the filter frame 22 and is detachably attached to the first end 3E-1 of the lens unit 3. When the attachment part 23 is attached to the first end 3E-1 of the lens unit 3, a distance from the filter 21 to the aperture 3A within the lens unit 3 is longer than a distance from the first end 3E-1 to the aperture 3A.

As can be understood from the above, the attachment part 23 coupled with the filter frame 22 is attached to the first end 3E-1 of the lens unit 3 and is detachable. Thus, in the imaging device 11, the filter 21 is easily attached and the orientation of the filter 21 is easily changeable.

Each of the various functions described in this embodiment may be realized by a circuit (processing circuit). An example of the processing circuit includes a programmed processor such as a central processing unit (CPU). This processor executes computer programs (instructions) stored in a memory so as to execute each of the described functions. The processor may be a microprocessor including an electrical circuit. Examples of the processing circuit include a digital signal processor (DSP), an application specific integrated circuit (ASIC), a microcontroller, a controller, and other electrical circuit components. Each of the components other than the CPU described in this embodiment may also be realized by the processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical filter associated with a lens unit having a first end, comprising:
   a filter part comprising a first filter area that transmits light rays of a first wavelength band and a second filter area that transmits light rays of a second wavelength band, the first wavelength band and the second wavelength band comprising a common wavelength band; and
   a filter frame that holds the filter part, the filter frame being detachably attachable to the first end of the lens unit and rotatable about an optical axis of the lens unit to adjust an orientation of the filter part about the optical axis,
   wherein
      the filter frame comprises a posture sensor configured to detect the orientation of the filter part about the optical axis.

2. The optical filter of claim 1, wherein
   the filter frame is cylindrical,
   the filter frame is detachably attachable to the first end of the lens unit by an attachment part, and
   the attachment part is cylindrical surrounding at least a part of the filter frame, or is cylindrical to be at least partly surrounded by the filter frame.

3. The optical filter of claim 2, wherein
   the filter frame is affixed to the attachment part by at least one of a screw and a lock ring.

4. The optical filter of claim 2,
   wherein the attachment part further comprises an index indicating the orientation of the filter part, the index to be positioned linearly with respect to an index attached to an imaging device by rotating the filter frame.

5. The optical filter of claim 1, wherein
   the filter frame comprises a clip to hold a camera main body to which the lens unit is attached or a casing of an electronic device comprising the lens unit.

6. The optical filter of claim 1, further comprising
   a lens hood frame to which a lens hood is detachably attached, wherein
   the lens hood frame is rotatable about the optical axis of the lens unit to adjust an orientation of the lens hood.

7. The optical filter of claim 1, further comprising:
   an indicator for displaying an angle indicating the orientation of the filter part about the optical axis.

8. An imaging device comprising:
   a filter part comprising a first filter area that transmits light rays of a first wavelength band and a second filter area that transmits light rays of a second wavelength band, the first wavelength band and the second wavelength band comprising a common wavelength band;
   a filter frame that holds the filter part; and
   a lens unit comprising one or more lenses through which the light rays transmitting the first filter area and the light rays transmitting the second filter area pass, wherein
   the filter frame is directly or indirectly attached to a first end of the lens unit so as to be rotatable about an optical axis of the lens unit to adjust an orientation of the filter part about the optical axis, and
   the filter frame further comprises an index indicating the orientation of the filter part, the index to be positioned linearly with respect to an index attached to the imaging device by rotating the filter frame.

9. The imaging device of claim 8, further comprising an image sensor comprising:
   a first imaging element configured to receive light rays of the common wavelength band;
   a second imaging element configured to receive light rays of a wavelength band which is within the first wavelength band and is different from the common wavelength band; and
   a third imaging element configured to receive light rays of a wavelength band which is within the second wavelength band and is different from the common wavelength band.

10. The imaging device of claim 8, wherein
    the filter frame is detachably attached to the first end of the lens unit by an attachment part.

11. The imaging device of claim 10, wherein
    the filter frame is cylindrical, and
    the attachment part is cylindrical surrounding at least a part of the filter frame, or is cylindrical to be at least partly surrounded by the filter frame.

12. The imaging device of claim 11, wherein the index comprises a screw that fixes the filter frame to the attachment part.

13. A ranging device comprising:
    an imaging device; and
    one or more processors configured to process an image acquired by the imaging device, wherein
    the imaging device comprises:
       a filter part comprising a first filter area that transmits light rays of a first wavelength band and a second filter area that transmits light rays of a second wavelength band, the first wavelength band and the second wavelength band comprising a common wavelength band;
       a filter frame that holds the filter part; and
       a lens unit comprising one or more lenses through which the light rays transmitting the first filter area and the light rays transmitting the second filter area pass, wherein
       the filter frame is directly or indirectly attached to a first end of the lens unit, so as to be rotatable about an optical axis of the lens unit to adjust an orientation of the filter part, and
       a center of gravity of the filter frame is positioned on an extension of one of:

a boundary line between the first filter area and the second filter area, or a line obtained by rotating the boundary line between the first filter area and the second filter area by a first angle about the optical axis.

14. The ranging device of claim 13, wherein the one or more processors are configured to calculate a distance to an object captured in the image by using the image.

15. The ranging device of claim 14, wherein the one or more processors are further configured to encode the distance information into the image.

16. The ranging device of claim 13, wherein the imaging device further comprises:

an image sensor comprising:

a first imaging element configured to receive light rays of the common wavelength band;

a second imaging element configured to receive light rays of a wavelength band which is within the first wavelength band and is different from the common wavelength band; and a third imaging element configured to receive light rays of a wavelength band which is within the second wavelength band and is different from the common wavelength band.

17. An optical filter associated with a lens unit having a first end, comprising:

a filter part comprising a first filter area that transmits light rays of a first wavelength band and a second filter area that transmits light rays of a second wavelength band, the first wavelength band and the second wavelength band comprising a common wavelength band; and a filter frame that holds the filter part, the filter frame being detachably attached to the first end of the lens unit and rotatable about an optical axis of the lens unit to adjust an orientation of the filter part about the optical axis, wherein a center of gravity of the filter frame is positioned on an extension of one of:

a boundary line between the first filter area and the second filter area, or a line obtained by rotating the boundary line between the first filter area and the second filter area by a first angle about the optical axis.

18. The optical filter of claim 17, wherein the filter frame is cylindrical, the filter frame is detachably attachable to the first end of the lens unit by an attachment part, and the attachment part is cylindrical surrounding at least a part of the filter frame, or is cylindrical to be at least partly surrounded by the filter frame.

19. The optical filter of claim 17, wherein the filter frame is affixed to the attachment part by at least one of a screw and a lock ring.

20. The optical filter of claim 17, wherein the filter frame comprises a clip to hold a camera main body to which the lens unit is attached or a casing of an electronic device comprising the lens unit.

* * * * *